United States Patent [19]
Bolme

[11] 4,118,460
[45] * Oct. 3, 1978

[54] REMOVAL OF NITROGEN OXIDES FROM INDUSTRIAL GASES BY USE OF OXIDIZING SOLUTIONS IN WHICH NITRATES ARE THE OXIDANTS

[76] Inventor: Donald W. Bolme, c/o Donald W. Bolme & Associates, 10655 NE. 4th St., Bellevue, Wash. 98004

[*] Notice: The portion of the term of this patent subsequent to Oct. 11, 1994, has been disclaimed.

[21] Appl. No.: 826,638

[22] Filed: Aug. 22, 1977

Related U.S. Application Data

[60] Division of Ser. No. 548,104, Feb. 7, 1975, Pat. No. 4,053,555, and a continuation-in-part of Ser. No. 259,402, Jun. 5, 1972, abandoned.

[51] Int. Cl.$^2$ .............................................. B01D 53/34
[52] U.S. Cl. .................... 423/235; 423/393; 423/400
[58] Field of Search .......... 423/235, 390–394, 423/400, 405

[56] References Cited

U.S. PATENT DOCUMENTS

| | | | |
|---|---|---|---|
| 2,098,953 | 11/1937 | Christensen | 423/392 |
| 2,673,141 | 3/1954 | Barman | 423/235 |
| 3,565,575 | 2/1971 | Warshaw | 423/235 |
| 3,714,333 | 1/1973 | Ohrui et al. | 423/392 |
| 3,927,183 | 12/1975 | Oushibw | 423/393 |
| 4,053,555 | 10/1977 | Bolme | 423/235 |

OTHER PUBLICATIONS

Mellor, "A Comprehensive Treatise on Inorganic & Theoretical Chemistry," Longmans, Green & Co., N.Y., N.Y., vol. VIII, 1928, pp. 455–457.

*Primary Examiner*—Earl C. Thomas
*Attorney, Agent, or Firm*—Strauch, Nolan, Neale, Nies & Kurz

[57] ABSTRACT

Nitric oxide may be removed from gases with which it is admixed by contacting the gases with aqueous solutions containing nitrate ions in sufficient concentration to oxidize the nitric oxide to nitrous acid and to retain it in the solution under stable conditions. Other oxides of nitrogen can also be absorbed producing nitrous acid which is retained in the aqueous solution in a similar manner. Thereafter, the scrubbing solution is regenerated under controlled conditions, producing a gas stream which contains the recovered nitrogen oxides in relatively high concentration and a scrubbing solution which can be recycled. The recovered nitrogen oxides may be used in the manufacture of nitric acid or other compounds or decomposed into harmless gases.

21 Claims, 8 Drawing Figures

REMOVAL OF NITROGEN OXIDES FROM INDUSTRIAL GASES BY USE OF OXIDIZING SOLUTIONS IN WHICH NITRATES ARE THE OXIDANTS

CROSS REFERENCE TO RELATED APPLICATION

This application is a division of application No. 548,104 filed Feb. 7, 1975 (now U.S. Pat. No. 4,053,555). The latter is a continuation-in-part of application No. 259,402 filed June 5, 1972 (now abandoned).

The present invention relates to the removal of selected constituents from gas mixtures and, more particularly, to novel, improved methods for removing nitrogen oxides from such mixtures in order to eliminate the oxides as a source of air pollution and/or to recover the oxides for a feedstock.

BACKGROUND OF THE INVENTION

Nitrogen oxides, nitric oxide and/or other nitrogen oxide gases have, in the past, been essentially discharged with waste gases into the atmosphere. The industrial activities creating these gases, which may no longer be discharged in such quantity because of today's air pollution standards, include, for example, the production of nitric acid, cleaning, pickling, and/or dissolving of metals, decomposition of nitrates and other nitrogen containing materials, and subjecting mixtures of oxygen and nitrogen to high temperatures. There are some existing nitrogen oxides recovery processes now being used to reduce or eliminate the nitrogen oxides in waste gas streams prior to their discharge and they are described as follows:

Nitric Acid Process

A nitric acid process is used, whereby air is added to produce an oxygen to nitrogen oxides ratio of at least 3 to 4 and thereafter the gas is caused to pass through a series of towers, called scrubbing towers, and water is added to the towers, entering first that tower which the gas enters last and then proceeding to the next to the last tower, etc., so as to scrub the gas in a countercurrent fashion. This is the process used for industrial production of nitric acid. This process is efficient when operated at about 100 pounds pressure per square inch above atmospheric pressure and if the gases fed to the system are rich in nitrogen oxides, having an initial concentration of about 9 percent. The efficiency of the process drops as this concentration drops and/or when operated at lower pressures, becoming relatively ineffective when the nitric oxide concentration is low, particularly if the pressure is also low.

Scrubbing With Basic Solutions

Processes are used for scrubbing the waste gases with basic solutions, such as sodium hydroxide, sodium carbonate or bicarbonate. However, they are only effective if at least half of the nitric oxide is first oxidized to nitrogen dioxide and then it is dissolved in these basic scrubbing solutions. This process is limited by the need for oxidation of the nitric oxide and by either the market demand, or the cost of disposing or processing of the nitrate and nitrite salts produced. Other alkali or alkaline earth compounds, particularly the hydroxides and salts of weak acids, can be used in the same manner but are subject to similar limitations.

Catalytic Combustion Process

The process is used of catalytic combustion of the waste gases in a hot catalyst bed where fuel is added and reactions occur that destroy the nitrogen oxides and where the products are further reacted with additional air to consume excess fuel. This process consumes natural gas and wastes the nitrogen oxides. In large plants where turbines are used to recover energy from the waste gases this process increases the amount of energy recovered and its cost is therefore partially recovered. In plants which do not use power recovery turbines the cost is not partially compensated and therefore the process is not often used.

Scrubbing With Water

The process is used of scrubbing with pure water to recover the nitric oxide. However, the low solubility of nitric oxide in water generally renders this process as being considered impracticable at the recovery levels now required. For example, in operating a nitric acid plant the waste gas may contain 0.25 percent nitric oxide in a departing tail gas at 100 pounds per square inch gage pressure. Under these conditions, only about fifteen pounds of nitric oxide may be dissolved in a million pounds of water, so a 500 tons per day nitric acid plant such as one using a process such as that shown in FIG. 1 and described below, using pure water to scrub nitric oxide from the waste gases, would be required to use 300,000 tons of scrub water per day.

Adsorption on Molecular Sieves

The process has been reported whereby nitrogen oxides are removed from waste gas streams by contacting them with molecular sieves, which are normally in the form of granular solids, adsorbing the nitrogen oxides on these particles, and later desorbing the nitrogen oxides from the particles under controlled conditions. The molecular sieves required are relatively expensive, however, they degrade with use so replacement is necessary, and their use requires special equipment to transfer the sieves, which are a granular powder, and to withstand the erosion which is entailed. Thus, there remains a need for a process whereby nitric oxide could be effectively and economically removed from relatively dilute gases to meet and/or to better all established and proposed limits of both government and industry.

SUMMARY OF THE INVENTION

I have now discovered a novel process which effectively and economically removes nitrogen oxides from industrial gases and recovers these materials as a gas stream in which the nitrogen oxides are relatively concentrated and suitable for use as raw material for a nitric acid plant or for other use or for disposal. The removal process is based on the recognition of nitric oxide, NO, not as an acid gas, as it is frequently considered, but as a reducing gas, which may be oxidized in the liquid phase to form nitrous acid, $HNO_2$. Moreover, if first oxidized into nitrous acid, $HNO_2$, thereafter the solubility is greatly increased (by approximately a factor of 10,000). Further, that nitric acid, $HNO_3$, in the proper concentration range, alone or in conjunction with other active nitrate materials such as nitrate salts, may effectively handle the oxidation and, acting as oxidizing agents, stabilize the nitrous acid, $HNO_2$, so formed. Further, that the same active nitrate materials, acting as oxidizing agents, will stabilize the nitrous acid formed by the solution and hydration of other nitrogen oxides such as $NO_2$, $N_2O_3$, and $N_2O_4$.

Also a proper selection of the nitrate salts used, if any, may increase the capacity of the solution for retaining nitrous material by converting some the nitrous acid, $HNO_2$, into relatively un-ionized nitrite salts or nitrite complexes. This has the effect of increasing the amount of nitrous material which the solution can stabilize by minimizing the vapor pressure of nitrous acid and minimizing the rate at which nitrous acid reacts to form, or reform, nitric oxide.

This nitric oxide recovery process and its associated equipment supplies an oxidant which reacts rapidly with nitric oxide. It is therefore not dependent upon the gas phase oxidation of nitric oxide, which is slow in dilute gases, and its performance is not limited by the amount of such oxidation. It is therefore superior to the process used to produce nitric acid and to those which scrub with bases, particularly when the gas to be treated is at atmospheric pressure or has a low nitric oxide concentration or both.

This recovery process produces only one product, nitrous acid, which is soluble in the scrubbing solution to the extent necessary to economically remove it from the scrubbing system.

This recovery process creates a spent scrubbing solution which is easily regenerated by reversal of the oxidation-absorption reaction or by other means such as distillation. When this is done there is no net loss of oxidizing power to the system and the nitric oxides may be recovered as a concentrated gas suitable for use in the manufacture of nitric acid.

This recovery process produces no secondary product which must be sold or disposed of as waste. In other processes which scrub the waste gas with a basic material a secondary product is obtained.

This recovery process requires no purchase of material not already in the process. This is in contrast to the processes which scrub with bases or use catalytic combustion or use molecular sieves.

This recovery process can be improved, in some cases, by the use of metallic compounds. Any compounds so used are regenerated as an integral part of the process. The materials used are therefore not consumed, in contrast with the materials required by processes which scrub with bases, or catalytically decompose the nitrogen oxides, nor are they degraded with use as are the molecular sieves required for the process which adsorbs the nitrogen oxides on molecular sieves.

This recovery process is capable of economically recovering the nitrogen oxides in the tail gas of an existing nitric acid plant and producing them in a form which can be used to produce additional product in the existing facility. This is in contrast to all other processes, save only the nitric acid process itself and the molecular sieve process.

This recovery process involves no unnecessary risk of product contamination which might result from introduction of materials not already in the system. This is because the process can be run without the addition of such materials.

This recovery process requires no new or unique equipment. It is implemented with equipment and procedures which are already well known in the industry.

This recovery process offers an opportunity for substantially increasing the amount of nitric acid which is produced by existing plants. The existing plants may produce more nitric acid than they now produce by accepting more nitric oxide gas as feed. Previously they were prevented from doing so by the economic and legal penalties associated with the greatly increased loss of nitrogen oxides which would result. Now these penalties are avoided by recovering nitrogen oxides which would otherwise be wasted by release to the atmosphere.

This recovery process allows new plants to be designed without the constraints previously imposed both by the technical difficulties of recovering nitrogen oxides from dilute gas mixtures, and by the economic and legal penalties associated with failure to recover them. Also it is suitable for implementation with either of the two major processes now used to produce nitric acid and it is flexible enough to be adapted to take advantage of the technical and economic conditions of individual plants.

Moreover, this nitrogen oxides recovery program is flexible enough to adapt to other nitrogen oxide problems including, as an example, the nitrogen oxides released by nitric acid recovery plants and those produced by thermal reaction between nitrogen and oxygen.

Finally, this nitrogen oxides recovery process may be used to strip nitrous materials from various aqueous solutions such as, for example, the solutions used in the cleaning, etching, dissolving, or otherwise treating metals. When so used this process produces a liquid, stripped of nitrous materials and suitable for direct return to the bath, and a rich nitrogen oxides stream, small in volume, contaminated with water vapor but very little air, and suitable for use in a nitric acid recovery facility or for other use or disposal.

Finally, nitrous solutions containing nitrates, with or without the presence of the salts of nitrous acid, $HNO_2$, and nitric acid, $HNO_3$, may be regenerated in any of several ways to produce a gas rich in nitrogen oxides, suitable for use in a nitric acid plant or other use or disposal and a liquid suitable for adjustment and reuse as a scrubbing solution or for other use or for disposal.

When used in treating industrial gases this process includes the scrubbing of gases containing nitric oxide, NO, and/or other nitrogen oxides using scrubbing solutions having more concentrated reactive nitrate materials derived from nitric acid, nitrate salts and all other materials capable of reacting with nitric oxide to produce nitrous materials as by the reaction noted by the equation $$HNO_3 + 2NO + H_2O \rightarrow 3HNO_2 \qquad (1)$$

(Or, more generally, $$NO_3^- + 2NO + H_2O \rightarrow 3NO_2^- + 2H^+$$

because, as suggested and as will be discussed in more detail hereinafter, part or all of the nitrate ions can be supplied by the use of nitrates other than nitric acid) and to contain nitrous material as a solute until, under controlled conditions, regeneration occurs upon reversal of this reaction or by other means. Moreover, this process which recovers the most difficult nitrogen oxide normally present in industrial gases, specifically nitric oxide, NO, does also have major advantage in recovering nitrogen dioxide, $NO_2$, and various additive combinations of NO and $NO_2$, such as $N_2O_3$, and $N_2O_4$ and their reaction products with water. This advantage arises because each of these materials, upon dissolving in and reaction with water, form some amount of nitrous acid. The presence of nitrate materials, in amounts sufficient to stabilize nitrous acid, as previously described, does therefore make absorption of $NO_2$, $N_2O_3$, and $N_2O_4$ more effective by preventing the decomposition of the nitrous acid formed and the resultant formation and escape of nitric oxide, NO, as a gas in the industrial waste gas.

This nitrogen oxides recovery process, in removing the nitrogen oxides from industrial gases, reduces the content of nitrogen oxides in these gases to meet and go below the critical minimum levels set by government and industry for waste gases to be discharged to the atmosphere. No chemicals, fuels, or other materials are consumed.

Moreover, when this process is used to treat the tail gas of a nitric acid plant, the nitric acid yields are increased in economically important quantities. Production capacities of existing facilities are increased when the loss of nitrogen oxides is better controlled upon operation of this process, bringing the losses well below the levels which would otherwise be reached at these increased plant production levels. Also in this same respect, the capital otherwise required for new nitric acid producing facilities of a given capacity may be reduced, because use of this invention allows the construction of plants of greater capacity without requiring the larger sizes and/or greater numbers of scrubbing towers which would otherwise be required to keep the loss of nitrogen oxides in the waste gases at an acceptable level.

When used to remove and prevent the accumulation of nitrous materials in nitrate containing baths, such as the nitric acid, $HNO_3$, containing baths used to clean and otherwise treat metals, this process includes the continuous or intermittent transfer, by pumping for example, of some portion of the bath to a separated treatment device, stripping the nitrous material out of the material transferred by removing nitric oxide, NO, or $NO_2$ or their products of combination, $N_2O_3$ and $N_2O_4$, or the products produced by hydration of any of these, delivering the nitrogen oxide materials so removed to a point of use or disposal, and returning the stripped solution to the bath. When used as described, this process suppresses the tendency of these baths to fume or boil over and reduces or eliminates the problems associated with the nitrogen oxides released as an air pollutant from the baths themselves and from the hoods and ventilating fans normally associated with the use of such baths.

In general the temperature and pressure at which my novel nitrogen oxide removal process is carried out are not critical although it should be kept in mind that the gross pressure will affect the partial pressure of the nitric oxide. Similarly, the reaction temperature will have a bearing on the equilibrium constant, reaction rates, and volatility of the nitric and nitrous compounds.

THE PRIOR ART

Other processes for oxidizing nitric oxide are available as shown, for example, by U.S. Pat. Nos. 3,063,804 issued Nov. 13, 1962, to Morrow; 3,102,788 issued Sept. 3, 1963, to Newman; and 3,099,531 issued July 30, 1963, to Boynton. However, neither of these patents nor any other prior art of which I am aware in any way involves the concept of oxidizing nitrogen oxides to the trivalent form with nitrate ions so that the oxides can be dissolved in aqueous solution and thereby separated from gases with which they are admixed. Needless to say, there is also no conception of subsequently recovering the nitrous material from the aqueous solution and using it in a manufacturing process or decomposing it into harmless gases.

As discussed above, metal nitrates may be employed in my novel process as an oxidizing agent and to increase the capacity of the solution for nitrogen oxides. This distinguishes my process from those of the type disclosed in U.S. Pat. No. 3,661,512 issued May 9, 1972, to Oushiba. In processes as shown in that patent metal (potassium) nitrate is a product of the process, not a reactant. Furthermore, processes as disclosed in Oushiba are not capable of separating nitrogen oxides from other gases; and they are, indeed, not intended to be used for this purpose.

As will be obvious to those skilled in the relevant arts, my novel process is also unlike those epitomized by U.S. Pat. No. 3,714,333 issued Jan. 30, 1973, to Ohrui in which tetravalent nitrogen oxides are absorbed into solutions of nitric acid to increase the concentration of the acid in the solution. I am concerned with the formation of stable aqueous solutions of trivalent nitrogen compounds and not with increasing the strength of nitric acid. Conversely, the Ohrui process could not be employed for my purposes.

From the foregoing, it will be apparent that one important and primary object of the present invention resides in the provision of novel methods for removing nitrogen oxides from gases containing such compounds.

Other important, but more specific objects of my invention reside in the provision of processes in accord with the preceding object which:

(1) are efficient and economical;
(2) recover the nitrogen oxides in a form in which they can readily be used in the manufacture of nitric acid and other compounds;
(3) permit rapid removal of the nitrogen oxides from the gases with which they are mixed;
(4) can be carried out at moderate pressures and at ambient or only slightly elevated temperatures;
(5) employ a recyclable scrubbing solution;
(6) produce no secondary products;
(7) do not require molecular sieves, catalysts, or other expensive materials;
(8) are unlikely to produce product contamination;
(9) require no equipment not already in existence;
(10) do not require any fuel, chemicals or any other ingredient or raw material which must be purchased for consumption in the process;
(11) are highly versatile and can be employed in conjunction with virtually any nitrogen oxide producing process;
(12) are capable of reducing the nitrogen oxide content of gases to levels well below those required by current and contemplated air pollution standards;
(13) can also be employed to strip nitrous materials from aqueous solutions;
(14) are capable of effecting virtually complete recovery of the most difficult to remove nitrogen oxide viz., nitric oxide;
(15) have only minimal energy requirements.

Still other important objects and features and additional advantages of my invention will become apparent from the appended claims, the working examples, and from the ensuing detailed description and discussion taken in conjunction with the accompanying drawings.

BRIEF DESCRIPTION OF THE DRAWINGS

In the drawings, existing traditional or conventional equipment installed in present plants is drawn in light lines and designated by reference letters, and equipment added to implement my new and novel process is drawn in heavier lines and designated by reference numerals.

DETAILED DESCRIPTION OF PREFERRED EMBODIMENTS

Figure 1:
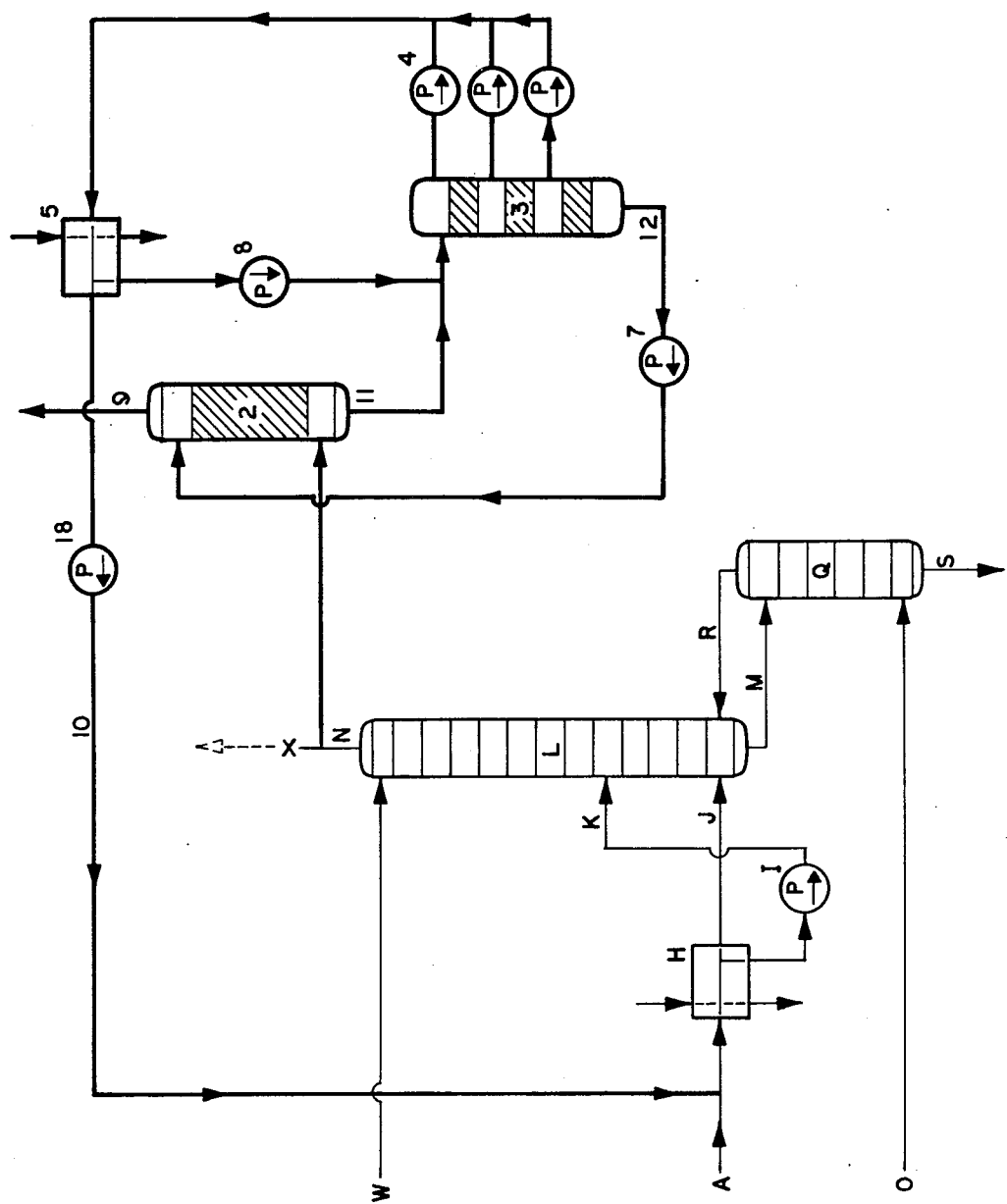
FIG. 1 illustrates how this nitrogen oxides recovery process equipment is added to a nitric acid plant utilizing a single pressure process.

Although my process for recovering nitrogen oxides from waste gases has many applications; its use in nitric acid plants seems to be foremost in creating economical benefits.

Environment of a Nitric Acid Production Plant

The nitric acid industry has, since the 1930's, been based primarily on the oxidation of ammonia to nitric oxide as expressed in the equation

$$4NH_3 + 5O_2 \rightarrow 4NO + 6H_2O \quad (2)$$

the subsequent oxidation of the nitric oxide to nitrogen dioxide as expressed in the equation

$$2NO + O_2 \rightarrow 2NO_2 \quad (3)$$

and the absorption of nitrogen dioxide in water to produce nitric acid and to regenerate nitric oxide, as expressed in the equation

$$3NO_2 + H_2O \rightarrow 2HNO_3 + NO \quad (4)$$

The reactions expressed in equations (3) and (4) present difficult problems to the chemists in industry.

The reaction expressed in equation (3) is a gas phase reaction which releases a great amount of heat. It is also a third order reaction and the rate decreases with increasing temperature. These factors combine to make it economically impossible to approach total conversion of nitric oxide to nitrogen dioxide in an industrial plant.

The reaction expressed in equation (4) is a liquid phase reaction which also releases a great amount of heat. Its rate, at least the absorption rate, also decreases with increasing temperature. In order for this reaction to occur it is necessary to: remove the heat from the reaction expressed in equation (3); dissolve the nitrogen dioxide in the solution; provide time for the reaction expressed in equation (4); desorb the nitric oxide formed back into the gas phase; and finally, the nitric oxide released by the reaction expressed in equation (4) must now be reoxidized by the reaction expressed in equation (3) but the rate is now drastically reduced. Every time one half the nitric oxide is converted to nitric acid the rate of the reaction expressed in equation (3) is decreased by a factor of about 8.

The result of these past and recent chemical-process-economic difficulties is that the nitric acid industry cannot economically recover the last few percent of the nitrogen oxides. Under normal conditions a typical nitric acid plant will waste about 2 percent of the inlet nitrogen oxides, releasing them as a minor component, 0.2 to 0.3 percent by volume, in their tail gas. This is equivalent to 20 pounds of nitric oxide per ton of 100 percent nitric acid produced. Plants can be "pushed" for production and nitric oxide releases of 40-50 pounds, per ton of nitric acid produced, occur under these conditions. However, any release of nitrogen oxides represents an air pollutant problem as well as an economic loss.

Recently the Environmental Protection Agency has suggested a limit of 3 pounds of nitrogen oxides per ton of nitric acid produced. Also the Manufacturing Chemists Association has proposed a limit of 4.3 pounds per ton. Using this nitrogen oxides recovery process, no difficulty is encountered in reducing the effluent flow of nitric oxide to below 2.0 pounds per ton and the process is capable of reducing the effluent flow of nitric oxide to less than 1.0 pounds per ton of nitric acid produced.

Nitrogen Oxides Recovery Process and Equipment Used in Various Nitric Acid Plants The nitrogen oxides recovery process for effective removal of nitrogen oxides from waste gases which I have invented involves the use of nitrate containing materials as reactive oxidizing agents in solutions which in turn are utilized to scrub nitrogen oxides from the industrial waste gases being emitted from plants such as those producing nitric acid. Moreover, these nitrate containing materials in the scrubbing solutions stabilize the nitrous material formed to retain it in solution, and subsequently, to allow it to be removed from the scrubbing system as a solute.

Thereafter, the scrubbing solution is regenerated. The nitrous material in it is converted in separated equipment under controlled conditions to produce both a gas containing nitrogen oxides useful again in the manufacture of nitric acid, and also a solution substantially purged of nitrous material which, after possible minor adjustments, is again suitable for use as the scrubbing solution or, in some cases, for other uses.

The nitrate containing scrubbing solutions have substantial concentrated reactive nitrate material derived from nitric acid, nitrate salts, and other nitrate materials, all which are capable of: reacting with nitric oxide to produce nitrous material in accordance with equation (1); containing nitrous material as a solute; and being regenerated by reversal of this reaction or by other means.

This nitrogen oxides recovery process is flexible. It is easily adapted or modified to each individual plant to maximize its efficiency and economy. So the process will always be effective, the amount of nitrate material used in the scrubbing liquid must be high enough so the nitric oxide is oxidized to nitrous material rapidly enough to prevent the liquid from developing an appreciable back pressure of nitric oxide. The nitrate concentration required will vary with each plant, the method used to apply this recovery process, and the other constituents in the liquid.

The maximum nitrate ion concentration which can be employed is a function of the temperature at which the nitrogen oxide removal process is carried out and of the concentration of nitrogen oxides permissible in the scrubbed gases and is limited in the case of nitric acid by the volatility of the compound and by the necessity of limiting the oxidation reaction $HNO_2 \rightarrow NO_2$ so as to achieve a substantial increase in the solubility of the nitrogen oxides. These considerations limit the nitrate ion concentration to 1.0–11.5 normal if nitric acid alone is employed as the nitrate ion source.

The lower limit on the nitrate ion concentration is a function of temperature, concentration of nitrogen oxides in the gases entering and discharged from the scrubbing operation, and the ratio of liquid to gases being scrubbed. Theoretically, concentrations as low as one normal can be used although it may in certain applications not be practical to use concentrations lower than three normal.

The relative amount of $NO_2$ which can be tolerated in the process and, therefore, the concentration of $HNO_3$ used will vary from plant-to-plant within the limits set forth above, depending upon the requirements of the plant.

It was pointed out above that part of the nitrate ions can advantageously be supplied by ionizable salts instead of entirely by nitric acid. The amount which is employed can be varied as desired with limits which will keep the product of the hydrogen ion activity and the nitrate ion activity $$[H^+][NO_3^-]$$

at the selected level and the nitrate ion concentration of the solution between the 1 and the 11.5 normal lower and upper limits discussed above. It will be apparent from this that it is impractical to specify numerically the percentage range of nitrate ions which can be employed in the scrubbing solution.

Also the nitrate content of the scrubbing solution must be high enough so the concentration of nitrous compounds, produced by dissolution and/or oxidation of nitrogen oxides, is less than that which the solution would hold if it were in equilibrium with the nitrogen oxides in the gas it is contacting. As an example, if the gas being scrubbed contains only nitric oxide and inerts, and the liquid contains only nitric acid and water, the nitric oxide will be converted to and stored as nitrous acid by the reaction expressed in equation (1). Therefore, the amount of nitric oxide which can be removed is limited by the amount of nitrous acid which can be stored; and this, in turn, is determined by an equilibrium expressed in the equation $$[HNO_2] = K([H+][NO_3^-](P_{NO})^2)^{1/3}, \quad (5)$$

where:

$[HNO_2]$ = gram moles per liter of nitrous acid which can be stored;

$[H+]$ = hydrogen ion activity which is equal to the hydrogen ion concentration, in gram equivalents per liter, multiplied by the activity coefficient;

$[NO_3^-]$ = nitrate ion activity which is equal to the nitrate ion concentration, in gram equivalents per liter, multiplied by the activity coefficient;

$(P_{NO})$ = partial pressure of nitric oxide in atmospheres; and

K = a constant which varies with temperature, equal to about ⅛ at 25° C.

Subsequently, under controlled conditions, the desorption takes place by reversal of the absorption reaction expressed in equation (1), and/or by similar reactions, operating in place of or in addition to this reaction such as the reactions expressed in equations $$HNO_2 + HNO_3 \rightarrow H_2O + 2NO_2 \text{ (or } N_2O_4\text{)}, \quad (6)$$

or $$2(HNO_2) \rightarrow H_2O + N_2O_3, \quad (7)$$

or $$2(HNO_2) \rightarrow H_2O + NO + NO_2$$

(8) or by evaporation of nitrous acid itself.

This desorption is initiated and/or promoted by each of the following, alone or in combination, being undertaken simultaneously or sequentially; lowering the pressure on the liquid; subjecting it to a vacuum; heating it; contacting it with steam, for example, by sparging or stripping; and/or contacting it with air, for example, by sparging or stripping.

The recovery of nitrous materials from liquids by these techniques is well-known (see, for example, Perry, CHEMICAL ENGINEERS' HANDBOOK, 4th Ed., McGraw-Hill Book Company, Inc., New York, N.Y., 1963); and they will accordingly not be described herein.

As indicated above, the nitrogen oxides removed from gases in accord with the principles of my invention can be destroyed instead of recovered, if desired for economic or other reasons. This can be accomplished by heating the gases to a temperature sufficiently high to decompose them to a mixture of nitrogen and oxygen. Temperatures of 2000° K. or higher are preferably employed.

The manner in which the gases are heated is not critical. An electrically heated quartz tube or direct flame heating may be employed for this purpose; or the gases may be mixed with the primary air feed to a boiler or furnace, as examples.

Thermal decomposition of the nitrogen oxides recovered by my process is practical because my process recovers them in a highly concentrated form; and it is, accordingly, economically feasible to heat the oxides to the requisite temperatures. And the economy of the decomposition process can be enhanced by using the decomposed gases to preheat those to be treated, thereby recovering substantial sensible heat from the products of the decomposition reactions.

The Nitrogen Oxides Recovery Process and Equipment Used In the Nitric Acid Plant Illustrated in FIG. 1, a Typical Single Pressure Nitric Acid Process In FIG. 1, the nitrogen oxides recovery equipment, and the process represented thereby, indicated in heavy lines and by reference numerals, is added to a single pressure nitric acid process, such as the du Pont process, indicated in light lines and by reference letters which is the most common single pressure nitric acid process. The identity and function of these devices and streams are as follows:

Stream A is the feed gas stream, produced, for example, by an ammonia oxidation system (not shown) and containing nitrogen oxides, oxygen, nitrogen, and water vapor, which is supplied as the primary raw material to the nitric acid producing facility. This stream will be at a pressure of 100–120 pounds per square inch above atmospheric pressure, psig.

Condenser H is a water cooled condenser which cools the gas and removes some condensate immediately before it enters the oxidation-absorbtion towers.

Pump I is a condensate pump.

Stream J is the gas stream actually fed to the oxidation-absorption tower system.

Stream K is condensate which contains some nitrous and nitric acid.

Tower L is the oxidation-absorbtion system. In actual practice Tower L may be several towers in series with the feed gas, Stream J, entering and the unbleached acid, Stream M, leaving the bottom of the first tower while the fresh water, Stream W, and the tail gas, Stream N, enter and leave the top of the last tower. The pressure in this system will normally be 100–120 psig.

In addition to the devices shown Tower L, or the series of towers represented by Tower L in FIG. 1, will normally be provided with a substantial amount of apparatus for the removal of heat, primarily the heat of the reactions expressed in equations (3) and (4) above.

Stream M is the concentrated, unbleached acid produced by the oxidation-absorbtion system.

Stream N is the tail gas from the oxidation-scrubbing system. Current practice is many nitric acid plants is to vent this stream to the atmosphere as shown by the dotted line and arrow in FIG. 1. Installation of my nitrogen oxides recovery process — to treat this tail gas — requires that this vent be stopped, such as by installation of a closed valve at the point marked "X", and that stream N be directed to the nitrogen oxides recovery system as shown in FIG. 1 and described in detail below.

Stream O is fresh air introduced to the system. In the system shown in FIG. 1 it will normally be at a pressure of about 120 psig.

Tower Q is the bleaching tower in which the crude acid stream, M, is purged of dissolved nitrogen oxides and nitrous acid by countercurrent contact with fresh air.

Stream R is air contaminated with the nitrogen oxides removed in the bleaching tower.

Stream S is product acid, the strength of which will be determined by the details of the specific facility.

Stream W is fresh water.

A more detailed discussion of the single pressure nitric acid process may be obtained from standard references such as Kirk and Othmer, Encyclopedia of Chemical Technology, 2nd Ed., Volume 13, pages 800–808, published by John Wiley & Sons, New York N.Y., (1967).

The Nitrogen Oxides Recovery Process to be Operated With This Nitric Acid Plant

The nitrogen oxides recovery equipment and the process represented thereby are in accord with the present invention. The tail gas from the nitric acid process is contacted (i.e., scrubbed) with an aqueous solution containing $NO_3^-$ ions supplied by nitric acid and/or other nitrates. Through the mechanisms described above, the oxides are removed from the gas and stabilized in the scrubbing solution as nitrites. The nitrogen compounds are then removed from the scrubbing solution and recirculated to the nitric acid process; and the scrubbing solution is recycled.

The system is depicted by heavy lines and reference numerals in FIG. 1 as follows:

Tower 2 is the scrubbing tower in which the nitrogen oxides are removed from the tail gas stream N. Those shown are packed with a nitric acid resistant packing such as porcelain or ceramic Rashig rings, Intalox, or Pall rings, for example. Alternatively a plate tower, tray tower, etc., could be used to provide the necessary gas-liquid contact.

Tower 3 is the desorption system where nitrogen oxides and reaction products in the scrubbing solution are recovered. The system shown is a packed tower operated at a relatively low pressure or under vacuum. Alternative desorption systems are possible.

Blowers 4 are used to remove the nitrogen oxides desorbed from the liquid in Tower 3, along with associated water vapor.

Condenser 5 is a water cooled condenser used to condense a majority of the water vapor in the recovered nitrogen oxides stream prior to compressing it to the pressure necessary for recycle to the nitric acid process.

Pump 7 is used to repressurize Stream 12 from the relatively low pressure existing in Tower 3 to the pressure used in Tower 2.

Pump 8 is a condensate pump used to repressurize the condensate produced in Condenser 5.

Stream 9 is the scrubbed tail gas produced by use of this invention which is cleansed of substantially all of the nitrogen oxides originally present in the gas, Stream N.

Stream 10 is the recovered nitrogen oxides stream which is suitable for return to the oxidation-absorbtion system.

Stream 11 is the used scrubbing solution containing the recovered nitrogen oxides, primarily as dissolved nitrous acid.

Stream 12 is the stripped scrubbing solution, suitable for adjustment and reuse as a scrubbing material or as a product.

Compressor 18 is the compressor used to pressurize the stream of recovered nitrogen oxides, Stream 10, to the pressure necessary to recycle it.

Design of the Absorption Tower

The absorption tower used in my process, whether a packed tower or a plate tower, is typical of those already well known in the nitric acid industry. However, the methods and calculations used to determine the size, etc. of the Tower labeled 2 in FIG. 1 and the Towers labeled 2 in the other figures are different than those normally used to design towers which are to scrub minor components from a gas mixture. Normal procedure in such designs, particularly in processes where the absorbed component reacts with a material in the liquid, is to assume that the rate of absorption at any point in the tower is controlled solely and only by the rate of transport of the material to be removed: (a) from the bulk of the gas to the liquid surface, that is, the gas-liquid interface; and (b) from the liquid surface into the bulk of the liquid. In effect, this assumes that all other processes necessary to the absorption are so much faster than the rate of transport that transport becomes the rate controlling mechanism.

In this recovery process, the reaction by which nitric oxide reacts with nitric acid, as expressed in equation (1) has a rate expressed by the equation:

$$\frac{-3}{2} \frac{d[NO]}{d\theta} = \frac{d[HNO_2]}{d\theta} = k'[HNO_2][H^+][NO_3^-] - \frac{k[HNO_2]^4}{(P_{NO})^2} \quad (9)$$

where:

$\frac{-d[NO]}{d\theta}$ = the rate at which nitric oxide is consumed by the reaction in units of gram moles of nitric oxide reacted per minute by each liter of liquid.

$\frac{d[HNO_2]}{d\theta}$ = the rate at which nitrous acid is formed by the reaction in units of gram moles of nitrous acid formed per minute by each liter of liquid.

$[HNO_2]$ = nitrous acid concentration in units of gram moles per liter.

$[H^+]$ = hydrogen ion activity which is equal to the hydrogen ion concentration in gram equivalents per liter multiplied by the activity coefficient.

$[NO_3^-]$ = nitrate ion activity which is equal to the nitrate ion concentration in gram moles per liter multiplied by the activity coefficient.

$(P_{NO})$ = partial pressure of nitric oxide gas, in equilibrium with the liquid in units of atmospheres.

$k'$ = a constant at any one temperature (equal to about 1.6 at 25° C.).

$k$ = a constant at any one temperature (equal to about 46 at 25° C.).

This rate is not infinitely fast in comparison to the rate of transport. Furthermore, the solubility of nitric oxide, NO, itself is small. Therefore, when designing Tower 2, it is necessary to provide for the transport and also for the rate of reaction. In other words the liquid cannot store nitric oxide as a dissolved gas because the solubility of nitric oxide is small. This means that the amount of nitric oxide transferred from the gas to the liquid in any specific cubic foot of tower volume must be equaled by the amount of nitric oxide oxidized to nitrous acid in the same cubic foot of tower volume.

This is not difficult to obtain once the need for it is recognized. In determining the size of the packed tower, the calculation is accomplished by selecting a nitric oxide concentration at the gas-liquid interface such that the amount of nitric oxide transferred from the bulk of the gas stream to the gas-liquid interface (which may be calculated by methods well known in the chemical engineering profession) is equal to or less than the amount of nitric oxide which is — or can be — converted to nitrous acid in that cubic foot. This latter value can be calculated from: (1) knowledge of the liters of the liquid present in the packing, under the tower operating conditions; and (2) the rate of reaction per liter as predicted by equation (9). However, the rate at which nitric oxide is absorbed in a cubic foot of tower volume is determined as the product of the rate of reaction per liter of liquid times the number of liters of liquid present per cubic foot of tower volume. Therefore, in contrast to normal practice, it is advantageous to use a packing which maximizes the volume of liquid in the tower.

In determining the size of a plate tower, the fact that the absorption is controlled by the liquid reaction rate means that the normal plate-to-plate calculation will not work. Instead it is necessary to balance:

(a) the rate of reaction on the plate — as calculated from the conditions on the plate, the rate of reaction, equation (9), and the volume of liquid on the plate — against (b) the amount absorbed on the plate — as calculated from the sizes and concentrations of the streams entering the plate and the sizes and concentrations of the streams leaving the plate.

This invention provides for flexibility of design and operation. For example, in a packed tower the rate of transport of nitric oxide from the bulk of the gas phase to the gas-liquid interface may be increased by increasing the concentration of nitric oxide in the bulk of the gas, by decreasing the nitric oxide concentration at the gas-liquid interface, or by improving the mass transfer characteristics of the tower itself by any of several methods well-known in the chemical engineering profession. Also the rate at which nitric oxide is reacted may be increased by numerous methods such as, for example, by increasing the rate of reaction per liter of solution, by increasing the hydrogen ion activity or the nitrate ion activity in the solution, or by increasing the nitric oxide concentration at the gas-liquid interface, all as indicated by equation (9); or by increasing the number of liters of liquid present in the packing at any one time.

In a plate tower the rate of transport of nitric oxide from the gas phase to the liquid phase is usually fixed at a very high level by the design of the tower. The rate of reaction in the liquid phase will tend to increase as the concentration of nitric oxide in the gas phase increases (see equation (9)), so the system is partially self-compensating. In addition, the rate of reaction may be increased by increasing the hydrogen ion activity or the nitrate ion activity.

It will be realized, by those skilled in the art, that Stream N will contain nitrogen oxide compounds more oxidized than nitric oxide, NO, such as $NO_2$, $N_2O_3$, and $N_2O_4$ and the products produced upon reaction of these more oxidized nitrogen oxide compounds with water. Any oxidation of nitric oxide, NO, to these materials is an advantage, as described below in the discussion of FIG. 3. Whether the designer will use this advantage or not will vary with the results desired by the designer. A fail-safe approach, that is one which will produce a device or "an absorber" which is larger than necessary but which will necessarily work, is to assume that all nitrogen oxides present are nitric oxide and that the only mechanism for absorbtion is that of the oxidation and absorbtion of nitric oxide and then design an apparatus sufficient to accomplish the necessary absorbtion by this route.

Design of the Desorption System of Recovery Process In Nitric Acid Plants

The desorption system, shown as Tower 3 in FIG. 1 and as Towers 3 in FIGS. 2, 3, 4, 5, and 6, can be designed in a manner basically similar to that outlined for the design of the absorption tower. Alternatives are available, however; and these add to the flexibility of the process and the options available to the designer.

Desorption requires that the conditions of the solution be changed such that the material previously absorbed has a marked tendency to leave the solution and reenter the gas phase. The process variables available to the designer of the absorption tower include the following, alone and in combination, and undertaken simultaneously or sequentially: lowering the pressure on the liquid; subjecting the liquid to a vacuum; heating and/or boiling it; contacting it with steam, for example by sparging or stripping; and/or contacting it with air, for example by sparging or stripping. Depending upon the design, at least some of these options will also be available to control the desorption process, for example, by varying the amount of steam used, or the pressure or vacuum under which the desorption takes place.

The first thing to realize in design of the desorption system is that all of the nitrogen oxides absorbed, regardless of their original identity as NO, $NO_2$, $N_2O_3$, or $N_2O_4$ or their reaction products with water, are stored in the solution as nitrites and nitrates. The nitrites (or the nitrous material) may be in the form of nitrous acid, nitrite ions, or unionized materials such as unionized metal nitrites or nitrite complexes. Any nitrates formed, such as by absorption of $NO_2$, are not different in kind from the nitrates used as the active oxidizing agents and will be distributed in the same fashion.

The second thing to realize is that regeneration of the solution requires only a removal of the nitrous material as necessary and adjustment of the nitrate content, if and to the extent necessary to return the solution to its original condition. The nitrous material may be removed by several routes:

Removal of nitric oxide by reversal of the reaction presented in equation (1). This reaction increases the nitrate concentration of the solution being treated.

Removal of nitric oxide and $NO_2$ in equal molar amounts by the reaction presented in equation (8) or, to effectively achieve the same end, by the reaction presented in equation (7) or the evaporation of nitrous acid, $HNO_2$. These reactions do not affect the nitrate concentration of the solution being treated.

Removal of $NO_2$ by the reaction presented in equation (6). This reaction decreases the nitrate concentration of the solution being treated.

In an actual operation, the regeneration involves a combination of these reactions; but their relative importance depends upon the conditions selected for the desorption.

It is significant that there is no rigid relationship between the degree of oxidation of the gases absorbed and the degree of oxidation of the gases desorbed. This offers the designer additional flexibility. If the conditions during desorption are such that the gases desorbed are more oxidized than those absorbed, the result will be a net depletion of the nitrate concentration in the scrubbing solution. This can be convenient if metal nitrates are used in the scrubbing solution since it assures against buildup of nitrate in the scrubbing solution. It does require, however, that makeup nitric acid be furnished to the scrubbing system.

Alternatively, the system is self-regulating. If the gases absorbed are more oxidized than those desorbed, the result will be a gradual increase in the nitric acid concentration of the scrubbing solution. This will cause an increase in the relative importance of the reaction presented in equation (6), which desorbs $NO_2$, and a decrease in the relative importance of the reaction, the reverse of that presented in equation (1), which produces and desorbs nitric oxide. This, which increases the $NO_2$:NO ratio, increases the relative oxidation of the gases desorbed and will continue until the level of oxidation of the gases desorbed matches that of the gases absorbed. At this point the accumulation of nitric acid in the scrubbing solution will stop.

The methods used in design vary with the results desired by the designer. A fail-safe approach, that is one which will produce a device which is larger than necessary but which will necessarily work, is to assume that the only mechanism for desorption is that of the desorption of nitric oxide and then design an apparatus sufficient to accomplish the necessary desorption by this route. Basically, this is the reverse of the calculations for the absorption of nitric oxide just described. The disproportionation of nitrous acid to form nitric acid, water, and nitric oxide proceeds at the rate predicted by equation (9) except that $$\frac{d[HNO_2]}{d\theta}$$

is negative, indicating a decomposition of $HNO_2$; and $$\frac{d[NO]}{d\theta}$$

is positive, indicating a formation of nitric oxide. In this desorption reaction as in the absorption design, it is necessary to assure that the concentration of nitric oxide at the gas-liquid interface is so chosen that the rate of transfer from the interface to the main gas stream will be at least as great as the rate of formation of nitric oxide from the liquid phase.

Alternative design methods are possible. The most obvious example is that of boiling the solution, perhaps at reduced pressure, to evaporate nitrous acid which, depending upon conditions, will tend to disproportionate to water, nitric oxide, NO, and $NO_2$ either just before or just after leaving the liquid phase.

Typical Material Balance in Reference to This Recovery Process at a Nitric Acid Plant If the nitrogen oxides recovery process is applied to a 500 ton/day nitric acid plant operating at design capacity and having 2500 ppm of nitrogen oxides in its tail gas which is the equivalent of 20 pounds of nitric oxide per ton of 100 percent $HNO_3$, the details of an installation which uses nitric acid as the sole active ingredient in the scrubbing solution would typically be:

EXAMPLE 1

Tower 2 operated at 100 psig, that is 115 psia, and 77° F., would have a 6 foot diameter and a 50 foot packed height. This tower would be fitted with a conventional device (not shown) such as a demisting pad wet with water to control the loss of any nitric acid vapor.

Tower 3, operating at 0.5 psia and 77° F., would have a 6 foot diameter and 3 beds, 3 foot packed height each. The same packing would be employed in each bed.

| Stream N | 146,700 lb/hr = 5240 moles/hr |
|---|---|
| $N_2$ | 98.9 mole % |
| $O_2$ | 0.45 mole % |

-continued

| | |
|---|---|
| NO | 0.25 mole %, equivalent to 20 lbs/ton |
| $H_2O$ | 0.43 mole % |
| Pressure 100 psig | |
| Temperature 77° F | |
| Stream 9 | 146,400 lb/hr = 5230 moles/hr |
| $N_2$ | 99.1 mole % |
| $O_2$ | 0.45 mole % |
| NO | 0.0125 mole %, equivalent to 1 lb/ton |
| $H_2O$ | 0.43 mole % |
| Stream 11 | 736,000 lbs/hr |
| 2.99 M $HNO_3$ | |
| 0.03085 M $HNO_2$ | |
| Stream 12 | 735,000 lbs/hr |
| 3M $HNO_3$ | |
| 0.003 M $HNO_2$ | |
| Stream entering Condenser 5 (at 1.0 psia) | |
| NO | 12.45 moles/hr |
| $HNO_3$ | 1.95 moles/hr |
| $H_2O$ | 471.6 moles/hr |
| Stream entering Pump 8 | |
| $HNO_3$ | 1.95 moles/hr |
| $H_2O$ | 445 moles/hr |
| Stream 10 | |
| NO | 12.45 moles/hr |
| $H_2O$ | 26.6 moles/hr |

As suitable apparatus and techniques will be obvious to chemists and chemical engineers, some details, for example, the points and methods by which the temperature is controlled, have not been included in FIG. 1. Also the methods chosen will depend upon the particular installation and one alternative is shown later, in FIG. 3.

EXAMPLE 2

An alternative installation which will achieve the same results as that just described is:

Tower 2, operated at 100 psig, that is 115 psia, and 77° F., has a 6 foot diameter sieve tray tower with 20 trays, each tray containing liquid equivalent to a 6 inch layer. This tower is fitted with a device to control the loss of any nitric acid vapor. One convenient method would be to furnish 2 to 4 additional sieve trays in the top of the tower to scrub the departing gas with water. These would be designed so as to hold the scrubbing water separate from the oxidizing-absorbing liquid, Stream 13.

Tower 3 operating at 0.5 psia and 77° F., would have a 6 foot diameter and 3 beds, 3 foot packed height each. The packing could be as described previously.

| | |
|---|---|
| Stream N | 146,700 lb/hr = 5240 moles/hr |
| $N_2$ | 98.9 mole % |
| $O_2$ | 0.45 mole % |
| NO | 0.25 mole %, equivalent to 20/lbs/ton |
| $H_2O$ | 0.43 mole % |
| Pressure 100 psig | |
| Temperature 77° F | |
| Stream 9 | 146,400 lb/hr = 5230 moles/hr |
| $N_2$ | 99.1 mole % |
| $O_2$ | 0.45 mole % |
| NO | 0.0125 mole %, equivalent to 1 lb/ton |
| $H_2O$ | 0.43 mole % |
| Stream 11 | 553,000 lbs/hr |
| 3.98 M $HNO_3$ | |
| 0.0375 M $HNO_2$ | |
| Stream 12 | 552,000 lbs/hr |
| 4M $HNO_3$ | |
| 0.0026 M $HNO_2$ | |
| Stream entering Condenser 5 (at 1.0 psia) | |
| NO | 12.45 moles/hr |
| $HNO_3$ | 1.95 moles/hr |
| $H_2O$ | 471.6 moles/hr |

-continued

| | |
|---|---|
| Stream entering Pump 8 | |
| $HNO_3$ | 1.95 moles/hr |
| $H_2O$ | 445 moles/hr |
| Stream 10 | |
| NO | 12.45 moles/hr |
| $H_2O$ | 26.6 moles/hr |

Alternatives and Variants in Reference to This Recovery Process at a Nitric Acid Plant One of the major advantages of my novel process is its flexibility. It can be adapted to individual installations, whether existing or planned, and is flexible enough in operation to compensate for variations in process conditions.

In Reference to Process Conditions

Chemical plants are usually designed to produce a certain amount of material under a particular, specified set of conditions, such as the cooling water temperature. In actual operating situations, these operating conditions may not be met. Cooling water temperature will vary with the season, for instance. My nitrogen oxides recovery process has the flexibility to adjust to these variations. As an example, the volumes or concentrations of the various streams may be varied to accommodate different situations. For example, the volume and-/or the acid concentration in Stream 12 would have to and could easily be increased if:

The total amount of nitrogen oxides in Stream N increased,
temperature in Tower 2 increased,
pressure in Tower 2 decreased,
volume of Stream 12 decreased.

Alternatively, nitric acid concentration in Stream 12 or the volume of Stream 12 might equally easily be decreased if a substantial fraction of the nitric oxide in Stream N were oxidized to nitrogen dioxide by the oxygen present in Stream N.

In Reference to Integration With Other Processes

The points and methods by which the nitrogen oxides recovery process is integrated with other processes may be varied as necessary or profitable. As examples, referring to FIG. 1, Stream 10 may alternatively, be routed to Stream J or Stream R; and the condensate from Pump 8 may be routed to Stream K. Makeup water, if required, could be supplied to a demister in the top of Tower 2. Other potential sources of makeup, acid or water, include Streams K, M, and S, all of which might best be supplied by introduction to the nitrogen oxides recovery system via Stream 11.

Variations in the Process Itself

Finally, although examples 1 and 2 present a process in which nitric acid is the only active material or oxidizing agent in the scrubbing solution, it will be understood that the scrubbing solution can, alternatively and advantageously in specific applications, contain one or more nitrate salts in addition to or in replacement of some or all of the nitric acid. Such nitrate salts may typically include: nitrate salts of alkali metals such as lithium, sodium, or potassium; nitrate salts of the alkaline earths such as magnesium and calcium; nitrate salts of metals with more than one valence state such as chromium, manganese, iron, cobalt, nickle, or copper;

nitrate salts of amphoteric materials such as iron, cobalt, zinc, aluminum, and tin; and nitrate salts of the lanthanides and actinides. The salts or mixture of salts used will depend upon the requirements of the individual application. The beneficial effects of the salts include several aspects in more or less important degrees according to the details of the particular installation.

The use of nitrate salts will allow an increase in the nitrate ion concentration. This is beneficial because it increases the capacity of the solution for nitrous acid according to the equation (5) above and, in addition, increases the rate at which nitric oxide is oxidized to nitrous acid as expressed by equation (9) above. This is done without a corresponding increase in the hydrogen ion concentration which would be undesirable as it would increase the concentration of unionized nitric acid and therefore the vapor pressure of nitric acid in the solution and the nitric acid content of the scrubbed gas stream, which nitric acid must either be recovered or released to the atmosphere as an air pollutant and an economic loss to the process.

As far as the increase in the capacity of the solution to stabilize and retain nitrous material is concerned, the amount of nitrous acid which can be retained or stabilized in the solution is determined by the conditions of the solution as defined in equation (5) above, and elaborated upon in the explanation which accompanies equation (5). The total capacity of the solution to dissolve, stabilize, and retain nitrous material, however, is the sum of that retained as nitrous acid, that retained as nitrite ions, and that retained as other, unionized nitrous material such as unionized nitrite salts or nitrite complexes. Inclusion of a metallic ion which forms unionized or substantially unionized nitrite salts or complexes under the conditions in the scrubbing tower by adding the corresponding nitrate to the scrubbing solution will, therefore, increase the total amount of nitrous material which can be held by the solution at the level of nitrous acid which can be stabilized by the solution as defined by equation (5). The metallic salt or salts or other materials chosen to achieve this purpose will depend upon the conditions in the nitrogen oxides recovery system, particularly the scrubbing tower and the desorption tower. This approach or modification is particularly advantageous when the amount of nitrogen oxides in the gas stream to be scrubbed is substantial.

The increase in the oxidative capacity of the scrubbing solution will be realized if the metallic salts chosen are such that the metallic ion may, under the conditions in the absorption tower, be reduced from a higher valence state to a lower valence state by reacting with nitric oxide and oxidizing it.

Examples of such metals are: iron, cobalt, nickel, copper, manganese, molybdenum, chromium, titanium, vanadium, tin and bismuth.

The use of salts with metals capable of undergoing a valence change will decrease the flexibility of the nitrogen oxides recovery process and the adaptability of the process, but only in that streams containing these salts or contaminated with them may not be transferred to the main nitric oxide oxidation-nitric acid production system without providing for their later separation from the nitric acid product. This would require no change in the flow system presented in FIG. 1 nor restrict any of the optional alternatives discussed above. It would mean only that Stream 11 or 12 could not be routed to the original or traditional plant, shown in light lines and designated by reference letters, without providing for separation of the metal salts at some point before the product, designated as Stream S in FIG. 1, is shipped to the customer.

Figure 2:
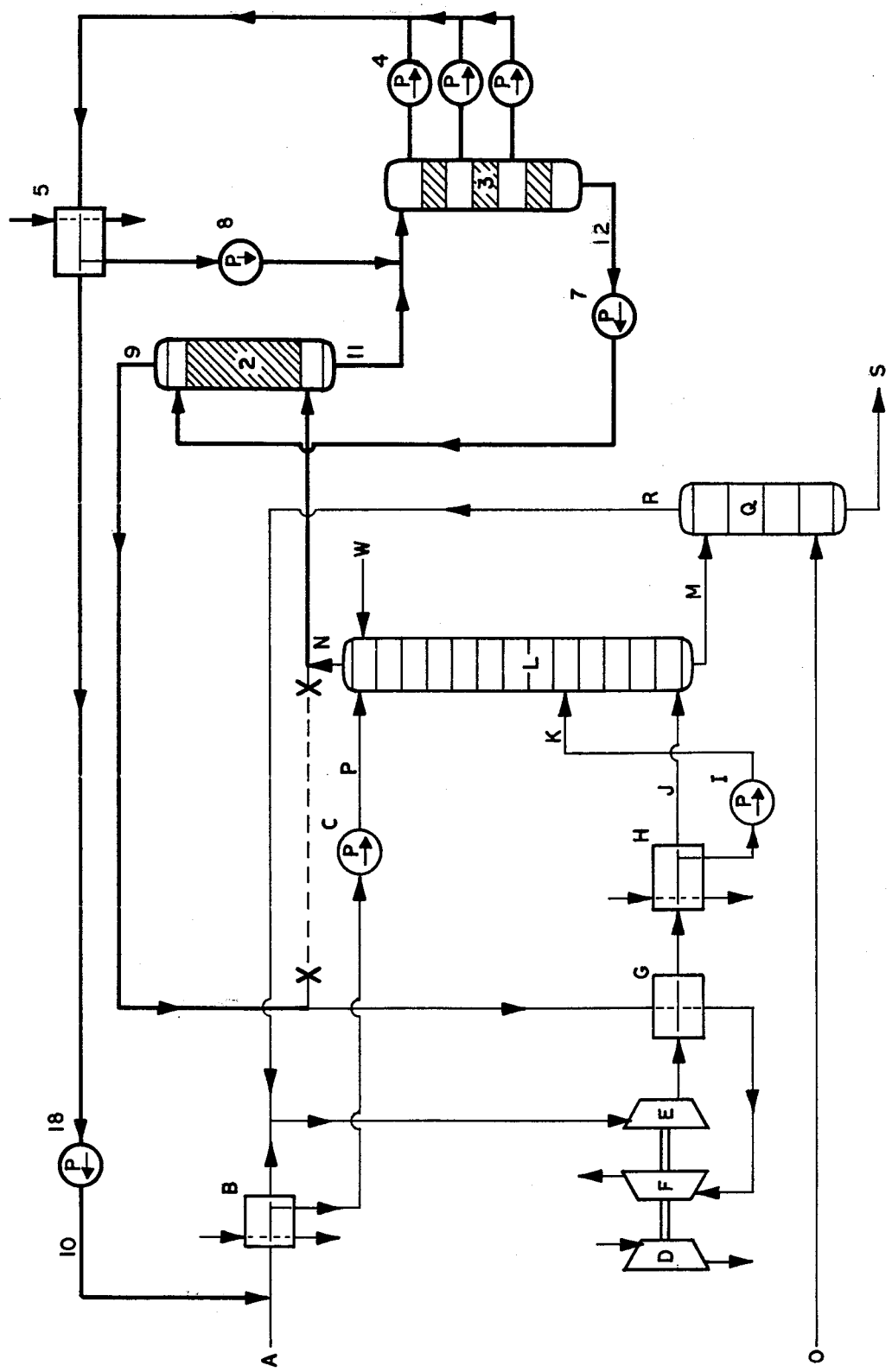
FIG. 2 shows how this nitrogen oxides recovery process equipment is added to a nitric acid plant utilizing a large split pressure process which uses a power recovery turbine.

The Nitrogen Oxides Recovery Process and Equipment Used In The Nitric Acid Plant Illustrated in FIG. 2 A Typical Dual Pressure Process — Also Called The European Process FIG. 2 shows the nitrogen oxides recovery equipment and the process I have invented and thereby, indicated in heavy lines and by reference numerals, added to a dual pressure nitric acid process, such as is popular in Europe and sometimes referred to as the European process, indicated in light lines and by reference letters. The dual pressure nitric acid process oxidizes ammonia to nitric oxide at pressures at or slightly below atmospheric pressure and then cools and compresses the product gases before they are oxidized to $NO_2$ and absorbed in water to make nitric acid. The identity and function of the various devices and streams shown in FIG. 2 are as follows:

Stream A is the feed gas stream, produced by an ammonia oxidation system (not shown) or by any other process capable of producing a nitrogen-oxides containing stream of sufficient volume and concentration. In a split pressure nitric acid plant based on ammonia oxidation, this stream will be at atmospheric pressure or slightly lower.

Condenser B is a water-cooled condenser; it is used to cool the gases and remove some of the water.

Pump C pumps the condensate from Condenser B to an oxidation-absorption system used in the manufacture of the nitric acid.

Turbine D is a power turbine run by steam. Alternatively, an electric motor can be used.

Turbine E compresses the gas fed from Condenser B and elsewhere in the process to a pressure of about 35 psig.

Turbine F is a power recovery turbine used to recover energy from the tail gases before releasing them.

Heat Exchanger G cools the compressed feed gas by transferring heat from it to the tail gas before the latter enters the power recovery turbine.

Condenser H is a water-cooled condenser which cools the gas and removes some condensate immediately before the gas enters the oxidation-absorption towers.

Pump I is a condensate pump.

Stream J is the gas stream fed to the oxidation-absorption tower system.

Stream K is condensate which contains some nitrous and nitric acid and is fed to the oxidation-absorption system by condensate pump I.

Tower L is the oxidation-absorption system. In actual practice the system may be several towers in series with the feed gas, Stream J, entering and the unbleached acid, Stream M, leaving the bottom of the first tower while the fresh water, Stream W, and the tail gas, Stream N, enter and leave the top of the last tower. The pressure in this system will normally be about 35 psig. In addition to the devices shown, Tower L, or the series of towers represented by Tower L in FIG. 2, will normally be provided with apparatus for the removal of heat, primarily the heat of the reactions expressed in equations (2) and (3) above.

Stream M is the concentrated, unbleached acid produced by the oxidation-absorption system.

Stream N is the tail gas from the oxidation-scrubbing system. Current practice in some large nitric acid plants is to route this stream directly to a heat exchanger and power recovery system as shown by the dotted line in FIG. 2. Installation of my nitrogen oxides recovery process requires that this gas be diverted through the nitrogen oxides recovery process by closing the existing line, such as by installation of closed valves at the points marked "X" in FIG. 2 and routing the Stream N through the recovery process to cleanse it of residual nitrogen oxides before it goes to the heat exchanger and power recovery turbine.

Stream O is fresh air introduced to the system to purge nitrogen oxides and nitrous acid from the acid. In the dual pressure process, it will normally be at about atmospheric pressure.

Stream P is a condensate stream from Condenser B, normally containing little acid; it is supplied to system L near the lean end of the system.

Tower Q is the bleaching tower in which the crude acid Stream M is purged of dissolved nitrogen oxides and nitrous acid by countercurrent scrubbing with fresh air introduced in Stream O.

Stream R is air contaminated with the nitrogen oxides removed in the bleaching tower; this air is combined with the feed gas ahead of Compressor E and recycled to the oxidation-absorption system L.

Stream S is product acid of a strength determined by the details of the specific facility.

Stream W is fresh water supplied to the oxidation-absorption system L to absorb the nitrogen dioxide produced in this system.

More detailed information on this process may be obtained from the Kirk and Othmer reference previously cited.

The Nitrogen Oxides Recovery Process — FIG. 2

The nitrogen oxides recovery equipment functions in essentially the same manner as that shown in FIG. 1 to scrub nitrogen oxides from the nitric acid process tail gases, to recover the nitrogenous material, and to recycle the scrubbing solution. The components employed and their functions and the various streams flowing to and from these components are as follows:

Tower 2 is the scrubbing tower. Those shown would be packed with a nitric acid resistant packing as described above. Alternatively, a plate tower, tray tower, etc., could be used to provide the necessary gas-liquid contact.

Tower 3 is the desorption system. Shown is a packed tower intended to be operated at a relatively low pressure. Alternate desorption systems may be used.

Blowers 4 remove the nitrogen oxides desorbed from the liquid in Tower 3 along with the associated water vapor.

Condenser 5 is a water-cooled condenser used to condense and thereby remove a majority of the water vapor present in the recovered nitrogen oxides stream prior to compressing the latter for recycle.

Pump 7 is used to repressurize stripped scrubbing solution discharging from the low pressure or vacuum existing in Tower 3 to the pressure used in Tower 2.

Pump 8 is a condensate pump used to pressurize the condensate produced by Condenser 5.

Stream 9 is the scrubbed, essentially nitrogen oxide-free tail gas produced by my invention. It may be heated and used in a power recovery turbine as shown or treated to prevent escape of nitric acid. This stream is cleansed of substantially all of the nitrogen oxides originally present in the tail gas, Stream N.

Stream 10 is the recovered nitrogen oxides stream which is suitable for return to the oxidation-absorption system.

Stream 11 is the used scrubbing solution containing the recovered nitrogen oxides, primarily as dissolved nitrous acid.

Stream 12 is the stripped scrubbing solution; it is suitable for adjustment and reuse as a scrubbing material or as a product.

Compressor 18 is used to pressurize the stream of recovered nitrogen oxides, Stream 10, to the pressure necessary to recycle or use it.

The utilization of this nitrogen oxides recovery process with the dual pressure nitric acid process is generally as described in conjunction with the single pressure shown diagrammatically in FIG. 1.

As in the latter, the relatively concentrated nitric acid or other nitrate material present in Stream 12 is capable of oxidizing nitric oxide to nitrous acid and is further capable of stabilizing the nitrous acid, thereby preventing its decomposition by reversal of the oxidation reaction to form or reform nitric oxide.

Tower 2 is designed so as to allow and provide for both the transport of nitric oxide from the gas phase to the gas-liquid interface and for the oxidation of nitric oxide to nitrous acid in the liquid phase. This design is conducted in a manner basically similar to that already described above for the design of Tower 2 in FIG. 1. Also, Tower 2 may include such devices as a washed demister, refrigerated coils, etc., to prevent the loss of nitric acid vapors.

The liquid, Stream 11, containing nitrous acid is regenerated by means such as those described above for regeneration of Stream 11 in FIG. 1; and the Products, Streams 10 and 12, and the condensate from Condenser 5, are redistributed in the manner shown or in such other manner as may best be suited to the process and the individual nitric acid facility.

Alternatives and Variants in Reference to Recovery Process Used in Dual Pressure Nitric Acid Process The alternatives, considerations, and options offered by the use of one or more metal nitrate salts, in addition to or in partial replacement of nitric acid used in the scrubbing solution, are the same for the process presented in FIG. 2 as those already discussed with respect to the process presented in FIG. 1.

Figure 3:
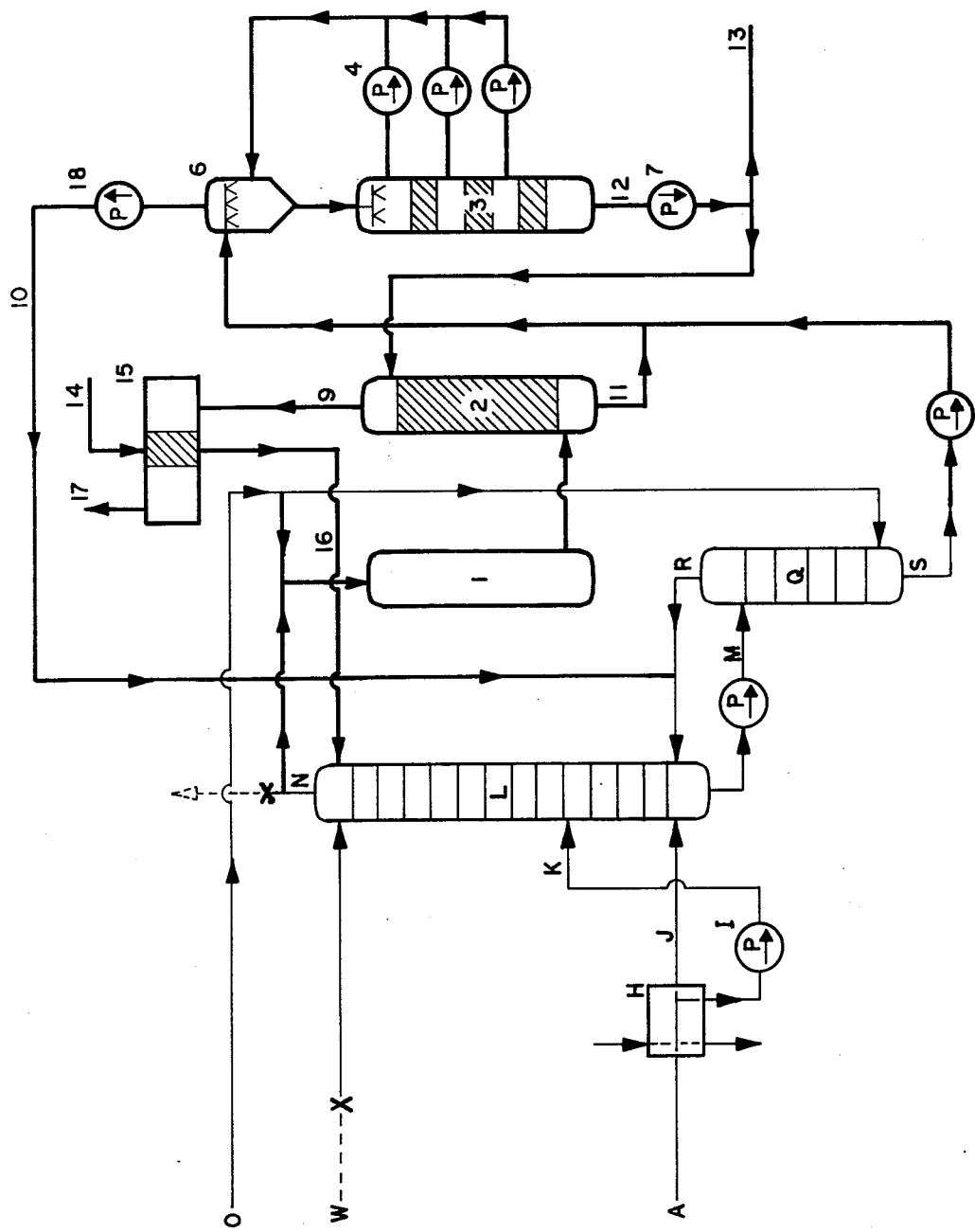
FIG. 3 indicates how a more complex implementation of this nitrogen oxides recovery process equipment is used in a larger capacity nitric acid plant.

The Nitrogen Oxides Recovery Process and Equipment Used In the Nitric Acid Plant Illustrated in FIG. 3, an Installation Designed to Both Control Pollution and Increase the Productive Capacity of a Large Single Pressure Plant As discussed briefly above, my novel nitrogen oxides recovery process offers an opportunity for increasing the productive capacity of a nitric acid plant. FIG. 3 represents a typical facility in which the nitrogen oxides recovery system is designed to control the pollution previously released by the main plant and, simultaneously, to increase the amount of nitric acid produced. The nitrogen oxides recovery equipment and the process represented thereby, indicated in heavy lines and by reference numerals, is added to a single pressure nitric acid process, such as the du Pont process, indicated in light lines and by reference letters. The nitric acid process depicted in FIG. 3 is similar to that depicted in FIG. 1; and the reference letters are used as in that Figure. However, the nitrogen oxides recovery equipment and the process represented thereby is implemented in a substantially different process order. This alternative increases productive capacity by increasing the amount of nitrogen oxides which can be tolerated in the gas effluent from the nitric acid plant, Stream N, while controlling pollution by maintaining an acceptable concentration in the final effluent gas, Stream 17. This flexibility is a major asset in that it allows by process to be integrated with a particular nitric acid plant in such a manner as to maximize the profitability of the combined facility.

The individual equipment of the nitrogen oxides recovery process, and the process represented thereby, is described as follows; and thereafter the differences between the process as illustrated in FIG. 3 and as illustrated in FIG. 1, the effect of these differences, and the reasons therefor are discussed.

Tower 1 is an empty tower which serves as a chemical reactor. It receives effluent Stream N and such additional air as advantageous and allows time for the reaction expressed in equation (3) to take place.

Towers 2 and 3 are a scrubbing tower and a desorption system as previously described.

Blowers 4 are used to remove the nitrogen oxides desorbed from the liquid in Tower 3 and the associated water vapor.

Condenser 6 is a direct contact condenser; it replaces Condenser 5 of the systems shown in FIGS. 1 and 2.

Pump 7 is used to repressurize the stripped scrubbing solution from the relatively low pressure existing in Tower 3 to the pressure used in Tower 2.

Stream 9 is the scrubbed tail gas leaving the scrubbing tower.

Stream 10 is the recovered nitrogen oxides stream; it is suitable for return to the oxidation-absorption system.

Stream 11 is the used scrubbing solution containing the recovered nitrogen oxides, primarily as dissolved nitrous acid.

Stream 12 is the stripped scrubbing solution, suitable for use as a scrubbing material or a product.

Stream 13 is the product.

Stream 14 is fresh water supplied to Demister 15.

Demister 15 is used to remove any nitric acid vapor or mist entrained in the Stream 9 of scrubbed tail gas.

Stream 16 is dilute acid recovered in Demister 15; it is supplied to the acid producing towers in lieu of the fresh water, Stream W, used in the FIG. 1 and 2 systems.

Stream 17 is the scrubbed, demisted tail gas.

Compressor 18 is used to pressurize the stream of recovered nitrogen oxides, Stream 10, to the pressure necessary to recycle it.

The nitrogen oxides recovery system employed in the FIG. 3 plant differs from those described previously in that Tower 1 is an empty tank which acts as a reactor by providing the time necessary to convert some of the nitric oxide in Stream N to $NO_2$ by the reaction expressed in equation (3); and air is supplied to the tower to furnish additional oxygen as and to the extent it will promote this reaction. Alternative methods of achieving this result, for example by replacement of Tower 1 with a catalytic reactor using silica gel, are possible. Also, the conversion of nitric oxide to $NO_2$ can be promoted by cooling the gas. Another important technique for oxidizing the nitric oxide to $NO_2$ is to react it with strong nitric acid prior to contacting the gases being treated with the aqueous scrubbing solution.

The advantage of converting NO to $NO_2$ is that the scrubbing solution is limited as to the amount of nitrous material it can absorb and stabilize; and the amount of nitrous material produced by absorption of $NO_2$ by the reaction expressed in the following equation $$2NO_2 + H_2O \rightarrow HNO_3 + HNO_2 \qquad (10)$$

is less than that produced by absorption of NO as expressed in equation (1). Any oxidation of NO to $NO_2$, therefore, increases the molar amount of nitrogen oxides that can be absorbed by the scrubbing solution before the capacity of the solution to stabilize nitrous material is exceeded.

Tower 2 is essentially similar to the absorption units illustrated in FIGS. 1 and 2. The differences in the absorption step are: (1) the amount of gas being passed through the tower will be increased, perhaps substantially; (2) the amount of liquid passing through the tower will also be increased; and (3) the concentration of the scrubbing solution, in terms of nitric acid, will probably also be increased. In addition to this, the oxidation of NO will become relatively less important and the solution of $NO_2$ relatively more important; the amount of heat released by the various reactions will increase; and the tower height may have to be increased to allow time for the increased reactions and dissolving to take place. The actual design and physical dimensions of Tower 2 may therefore be quite different. Tower 2 as illustrated in FIG. 3 will normally serve a larger plant than those illustrated in FIGS. 1 and 2. Alternatively, it may serve the same plant operated at much higher capacity. If so it will be larger in diameter and taller and may have arrangements to cool the process streams. It may be divided into two or more towers operated countercurrently.

The desorption system will probably also be larger than those shown in FIGS. 1 and 2.

The direct contact condenser 6 used in place of condenser 5 will be less expensive in some installations and has the advantage of heating the solution to be stripped, making complete stripping faster and easier.

It is also noteworthy that the entire product stream, produced by the original plant, Stream S, is combined with the used scrubbing solution, Stream 11. This has several advantages. Stream S provides makeup acid (and water) to Stream 11, thereby holding Stream 11 and therefore Stream 12 at a high nitric acid concentration. The new product stream, Stream 13, is thoroughly "bleached"; i.e., purged of nitrogen oxides, at little additional cost. It should be noted, however, that this particular arrangement will limit the allowable concentration of the product, Stream 13, to concentrations useful as a scrubbing liquid in Tower 2.

Alternatives and Variants — In Reference to FIG. 3

The options, alternatives, and considerations previously discussed in the application presented in FIG. 1 and summarized in FIG. 2 are also applicable to the FIG. 3 system. The use of nitrates other than nitric acid may be particularly advantageous except that Stream 12, contaminated with the nitrate salts used, could not be a source of the product, Stream 13. When using nitrate salts in the scrubbing solution, therefore, the product would be taken from Stream S and Stream 13 would be suppressed as in FIGS. 1 and 2.

If nitrate salts are not used, the bleaching tower Q may be eliminated. Both it and desorption tower 3 have as their sole function the removal of nitrous material from nitric acid. Tower Q can, therefore, be eliminated by routing the unbleached product acid, Stream M, to the nitrogen oxides recovery unit in place of Stream S. In this event Stream R will no longer be produced and will be replaced by fresh air (Stream O).

Figure 4:
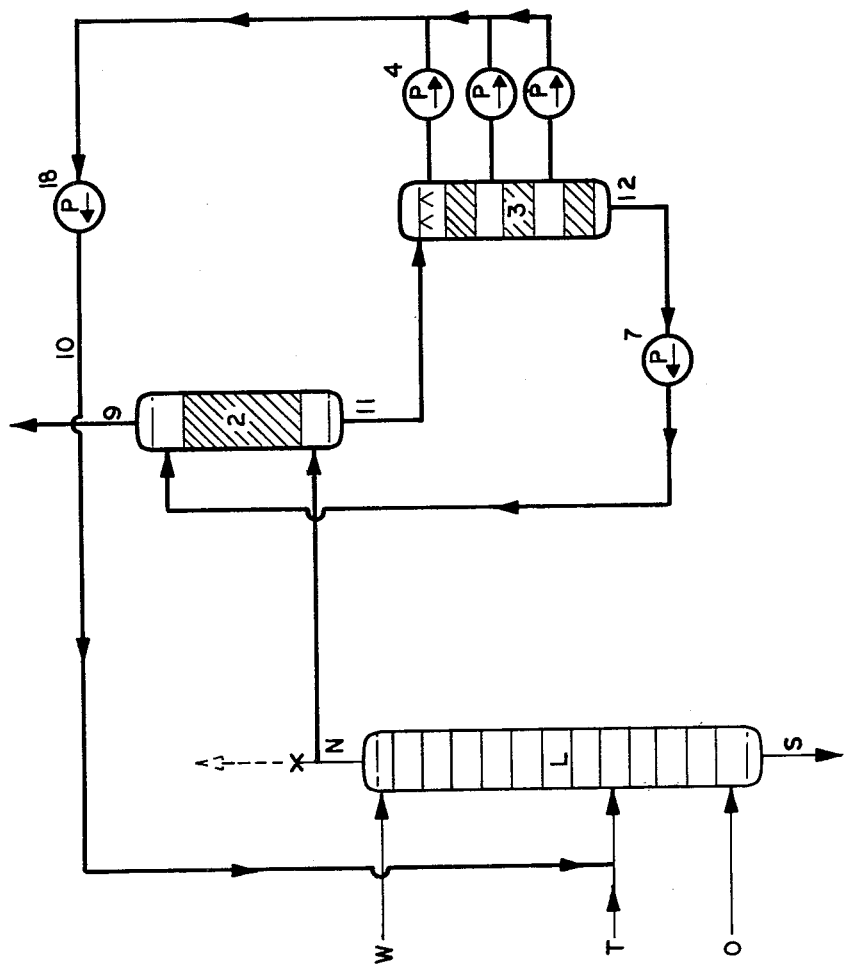
FIG. 4 illustrates how this nitrogen oxides recovery process equipment is used to improve the performance of a nitric acid recovery facility which processes waste gases such as those produced by a metal treating plant.

The Nitrogen Oxides Recovery Process and Equipment Used to Improve the Efficiency of a Typical Nitric Acid Recovery Plant Used to Treat the Nitrogen Oxides Released by a Metal Treating Facility and Recover Part of Them as Nitric Acid In FIG. 4 the nitrogen oxides recovery equipment and the process represented thereby, indicated in heavy lines and by reference numerals, is added to an existing nitric acid recovery facility, indicated in light lines and by reference letters. Such facilities are frequently used, for example in metal treating industries where they scrub off gases with water to reduce the nitrogen oxides emitted to the atmosphere, producing a weak nitric acid product which is used or disposed of as waste. A typical nitric acid recovery facility used at a metal treating plant has the following components as shown in FIG. 4:

Scrubbing Tower L. Here, nitric oxide is oxidized to nitrogen dioxide in the gas phase, and the nitrogen dioxide is absorbed in an aqueous solution to produce nitric acid and regenerate nitric oxide. That part of tower above the point of entrance of nitrogen oxide-containing feed gas functions in a manner identical to the towers or tower systems labeled L in FIGS. 1, 2, and 3. The bottom part of Tower L in FIG. 4, in which the acid solution produced passes countercurrently downward past an ascending stream of fresh air, Stream O, functions in a manner similar to the bleaching Tower labeled Q in FIGS. 1, 2, and 3.

Stream N is the tail gas released by the oxidation-scrubbing system L and handled as discussed above in conjunction with the embodiment of FIG. 1.

Stream O is fresh air introduced to the system for the oxidation of NO to $NO_2$. The pressure of this stream will be determined by the pressure in Tower 1.

Stream S is product acid, the strength of which will be determined by the details of the specific facility.

Stream T is a stream containing nitrogen oxides such as might be produced by a metal treating system.

Stream W is fresh water supplied to Tower L to absorb the nitrogen dioxide generated therein, converting it to nitric oxide and nitric acid by the reaction in equation (4).

The Nitrogen Oxides Recovery Process — FIG. 4

The nitrogen oxides recovery system of FIG. 4 is as follows:

Tower 2 is a scrubbing tower as previously described.

Tower 3 is a desorption system, also as described previously.

Blowers 4 remove nitrogen oxides and associated water vapor desorbed from Tower 3.

Pump 7 is used to repressurize scrubbing solution stripped of nitrogen oxides from the low pressure or vacuum existing in Tower 3 to the pressure used in Tower 2.

Stream 9 is the scrubbed tail gas.
Stream 10 is the recovered nitrogen oxides stream.
Stream 11 is the used scrubbing solution.

Compressor 18 pressurizes the Stream 10 of recovered nitrogen oxides to the pressure necessary to recycle it.

This system functions in the same manner as those shown in FIGS. 1 and 2; and the description of the modus operandi will accordingly not be repeated.

Variations may of course be made as in the other exemplary systems illustrated and described herein. As one example, the original product, Stream S, could be added to Stream 11 and the new product removed from Stream 12 in a manner similar to that depicted in FIG. 3. Also, nitrates other than nitric acid may be used in the scrubbing solution as and for the purposes discussed above.

The method used to design the system is the same as previously described although the dimensions, flows, etc. may be different.

Figure 5:
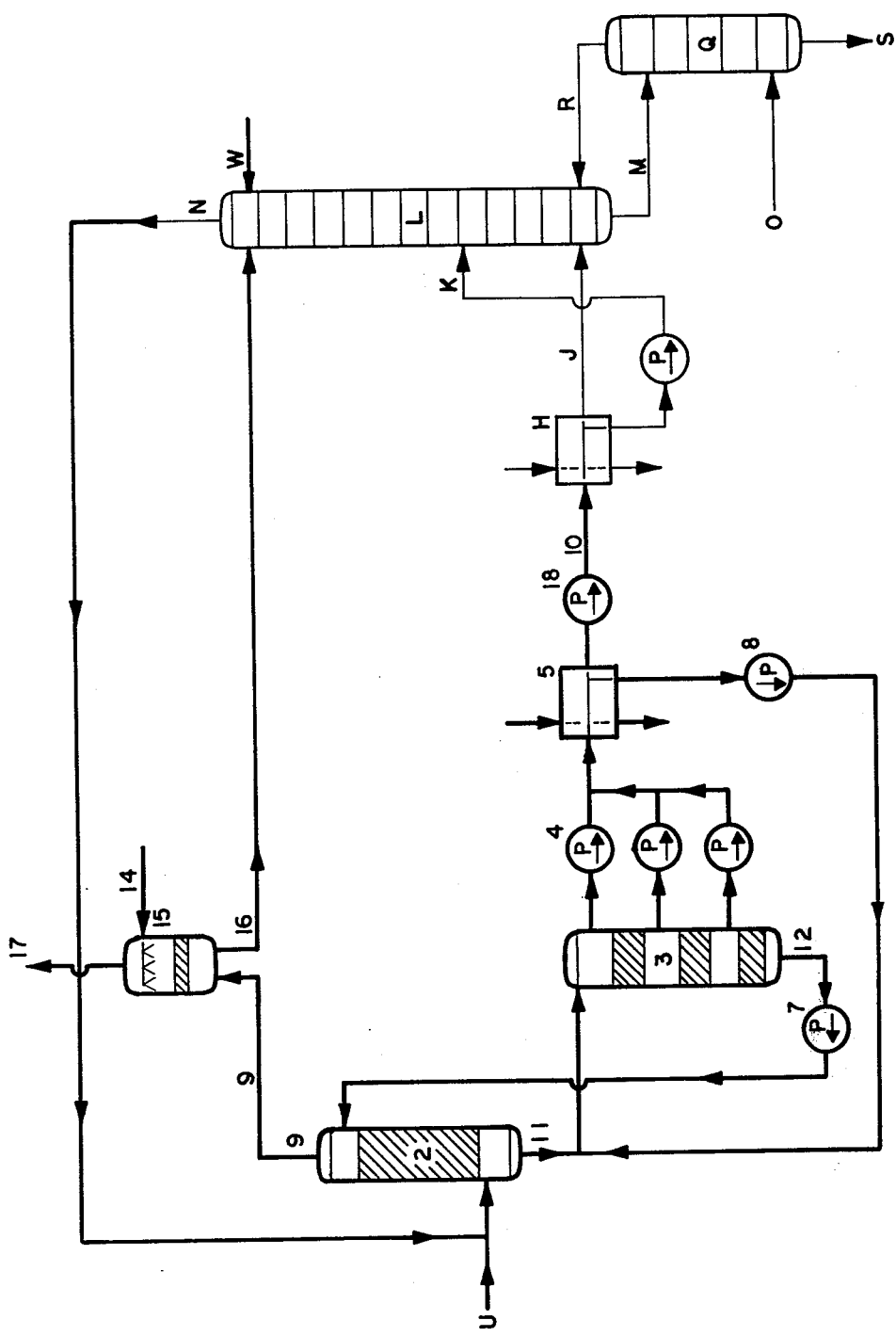
FIG. 5 shows how this nitrogen oxides recovery process equipment is used to recover nitrogen oxides from dilute nitrogen oxide streams produced by a thermal process and/or by an electric arc process.

The Nitrogen Oxides Recovery Process and Equipment Used To Remove Nitrogen Oxides From Dilute Gases, Such as Those Produced by a Thermal Process or an Electric Arc Process, And Their Recovery in a Form Suitable for Use as Feed to A Conventional Nitric Acid Plant In FIG. 5, the nitrogen oxides recovery equipment and the process represented thereby, indicated in heavy lines and by reference numerals, is used to treat both a dilute nitrogen oxides stream and also the effluent from a standard nitric acid plant, producing a concentrated nitrogen oxides stream suitable for use as feed to a standard nitric acid plant and an effluent stream suitable for use as a feedstock or for discharge to the atmosphere. In this process, the dilute nitrogen oxides stream, Stream U, is the original source of the nitrogen oxides used to produce nitric acid in the nitric acid plant. Such dilute streams of nitrogen oxides are produced industrially, for example by thermal and electric arc processes; and it may arise as a by-product of some other operation such as the operation of metal treating systems or the decomposition of nitrates. In this nitric acid plant:

Condenser H is a water-cooled condenser which cools the feedstock gases and removes some condensate immediately before the gases enter the oxidation-absorption towers.

Pump I delivers condensate from condenser H to the oxidation-absorption towers.

Stream J is the gas stream as fed to the oxidation-absorption tower system.

Stream K is the condensate from condenser B; it contains some nitric acid. Tower L is an oxidation-absorption system as described above.

Stream M is the concentrated, unbleached acid.

Stream N is the tail gas from the nitric acid plant.

Stream O is fresh air introduced to the system as and for the purposes previously described.

Tower Q is the bleaching tower in which the crude acid, Stream M, is purged of dissolved nitrogen oxides and nitrous acid by countercurrent scrubbing with fresh air.

Stream R is air contaminated with the nitrogen oxides removed in the bleaching tower.

Stream S is product acid.

Stream U is feed stream which contains nitrogen oxides at a sufficiently low concentration that concentration prior to processing for production of nitric acid is advantageous.

The Nitrogen oxides Recovery Process — FIG. 5

In the nitrogen oxides recovery equipment and the process represented thereby:

Towers 2 and 3 are the scrubbing towers and the desorption system.

Blowers 4 are used to remove the desorbed nitrogen oxides and the associated water vapor from Tower 3.

Condenser 5 is a water-cooled condenser used to condense water vapor from the recovered nitrogen oxides stream prior to compressing the stream to the pressure necessary for use as feed to the nitric acid plant.

Pump 7 is used to repressurize nitrogen oxide free scrubbing solution from the pressure existing in Tower 3 to the pressure in Tower 2.

Pump 8 is used to repressurize the condensate produced by Condenser 5.

Stream 9 is the scrubbed tail gas.

Stream 10 is the recovered nitrogen oxides stream.

Stream 11 is the used scrubbing solution.

Stream 12 is the stripped scrubbing solution.

Stream 14 is fresh water for Demister 15.

Demister 15 is used to remove any nitric acid vapor or mist entrained in the Stream 9 of scrubbed tail gas.

Stream 16 is the dilute nitric acid recovered in Demister 15; it is returned to the scrubbing system.

Stream 17 is scrubbed, demisted tail gas suitable for release to the atmosphere.

Compressor 18 is used to pressurize the stream of recovered nitrogen oxides, Stream 10.

Again, the functioning of the equipment is believed to be self-evident and will accordingly not be described.

The methods used to design this facility are, again, basically similar to those already discussed in the previous presentations of the process. Here, again, the flexibility of the process is a major advantage in that it may be integrated with the gas stream it is to treat the nitric acid plant it is to serve in any of several different ways.

The possibilities, options, and alternatives offered by the use of nitric salts in addition to or in partial replacement of the nitric acid are also available.

Figures 6, 7, 8:
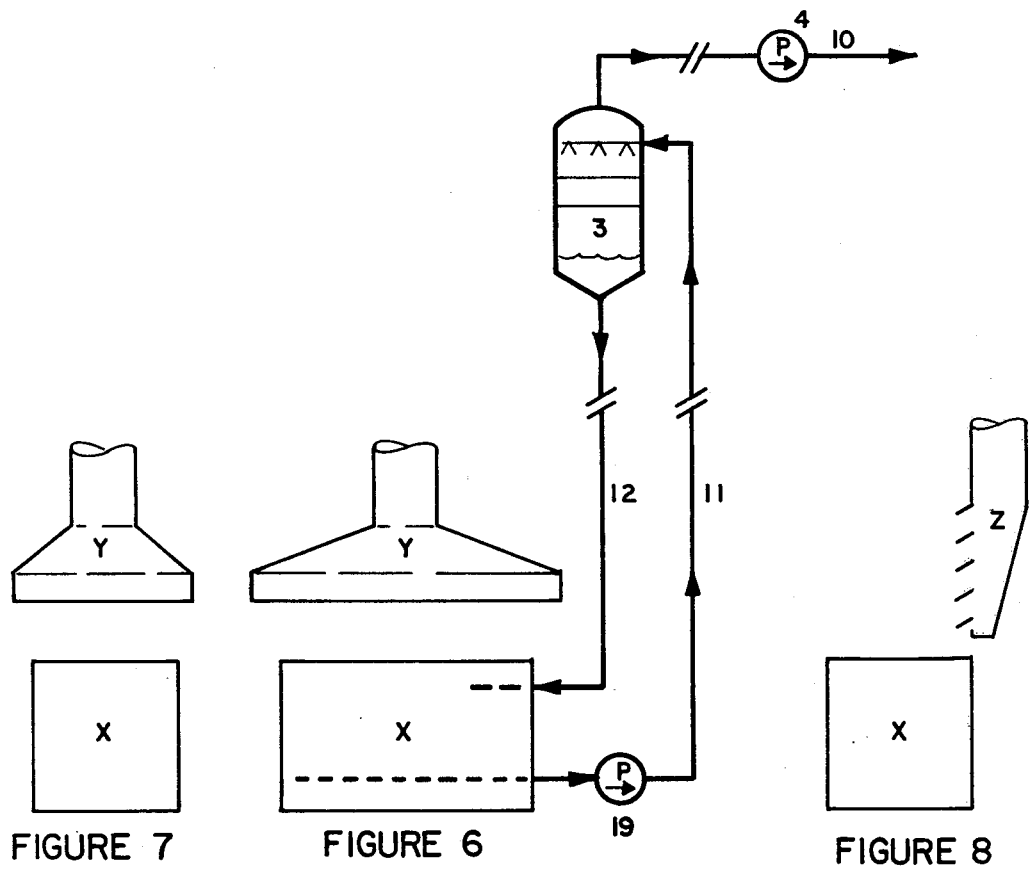
FIG. 6 shows how this nitrogen oxides recovery process equipment is used to recover nitrogen oxides from a solution containing nitrous material, such as the nitric acid containing baths used to clean or otherwise prepare metal.
FIG. 7 is a side view of an acid bath containing tank and fume collecting hood employed in the system shown in FIG. 6.
FIG. 8 shows a second type of hood commonly used with nitric acid baths to contain the fumes which escape therefrom.

The Nitrogen Oxides Recovery Process and Equipment Used To Remove Nitrous Materials From Metal Treating Baths As Illustrated in FIG. 6

In FIG. 6 the nitrogen oxides recovery equipment and the process represented thereby, indicated in heavy lines and by reference numerals, is used to remove nitrous material from a metal treating bath indicated in light lines and by reference letters. The metal treating baths shown are typical of installations which use liquids containing nitric acid and/or nitrates to clean, etch, or preferentially dissolve metals or metal items — for example, to preferentially remove cladding. It will be understood, however, that the same general approach and system can be used or adapted to remove nitrous material from other liquids and to recover the material removed as a relatively concentrated nitrogen oxides stream.

Any metal which dissolves and is oxidized by the $NO_3^-$ ions in a bath as just described causes a stoichiometrically corresponding amount of nitric acid or nitrates to be reduced. Nitrous material, nitrous acid or its salts, are a major product of this reaction. These materials frequently tend to remain dissolved in the liquid, at least temporarily. They must be removed however. Failure to do so can result in the buildup of quasistable nitrous material and agitation, such as is caused by the dipping of metal pieces in the bath, can cause this material to be released in a manner which will make the acid bath foam and/or "boil over".

As discussed below, the current removal techniques remove the nitrous material as bubbles of nitrogen oxides mixed with air. These gases are collected by the hoods normally used in conjunction with these baths; and the nitrogen oxides removed from the bath become, thereby, an important part of the air pollution problem associated with use of these baths.

Metal Treating Equipment — FIGS. 6 and 7

Tank X is a typical acid bath such as is used for dipping metals in order to clean, etch, preferentially dissolve, or otherwise treat the parts. The contents of this bath will typically consist of an aqueous solution of acids, inhibitors, surface active agents, and the materials removed from the metallic items being treated.

The exact composition and temperature of the bath will depend upon the material to be cleaned and the material; dirt, scale, cladding, etc., to be removed from it. Frequently, however, it will include nitric acid which acts as both an oxidizing agent and as an acid. In these cases the nitric acid will react with the scale, cladding, etc., oxidizing these materials and being itself reduced to form nitrous materials which remain in the bath until their concentration builds up to the point that the vapor pressure of the solution itself reaches one atmosphere.

As an example, in the manufacture of metallic uranium fuel elements, the round metallic uranium billets are placed in tightly fitted copper tubes and then extruded to reduce their diameter (the copper acting as a lubricant for the extruding die). The metallic copper cladding, now quite thin, is removed by dissolving it in a nitric acid bath in which the nitric acid oxidizes the copper to cuprous or cupric ions and is itself reduced to nitrous material which remains in solution in the bath.

As use of the bath continues, the vapor pressure of the nitrous material in its; $H_2O_3$, $HNO_2$, $NO_2$ (or $N_2O_4$) etc., depending upon the temperature and nitric acid concentration, will build up until it, added to the vapor pressure of water and $HNO_3$, reaches one atmosphere. At this point the bath will "boil" and can easily "boil over".

In the same example, "one more" piece of copper cladded metal dropped into the tank will:

product nitrous material (particularly in the near vicinity of the piece), deplete the nitrate concentration that had been stabilizing the nitrous material produced earlier (particularly in the near vicinity of the piece).

This will cause a "boilup" in the near vicinity of the piece which will bring material (solution) up from the bottom of the bath. This material will have more nitrous material dissolved in it because it, under 1–2 feet of heavy liquid, will have built concentrations to a vapor pressure greater than atmospheric. Eventually, the whole bath boils and turns over in 2–10 seconds, releasing much of its nitrous material at one time and — often — boiling over.

The normal procedure is to sparge air into the bath continuously in order to remove nitrous materials as they are formed, producing them as polluted air which is removed — more or less — by a hood.

Y is one type of hood commonly used to prevent escape of air pollutants from the bath into the building which houses it. Its drawback is that it dilutes the pollutants with a substantial amount of air producing, thereby, a large volume of polluted air which must be treated or released untreated to the atmosphere. It also has a disadvantage in that the clearance over the tank is so small that it is difficult to use the tank for treating heavy or bulky pieces of metal.

Z (FIG. 8) is a different type of hood which is used when clearance over the bath must be provided in order to provide the room necessary for moving bulky equipment into or out of the baths or to provide room for the trolley mounted chain hoists, etc., normally used if the parts to be treated are heavy. However, Hood Z is less efficient than Hood Y as a fume gatherer.

Both hood systems dilute the pollutants with a substantial amount of air. This makes the effluent gas more difficult and more expensive to treat for recovery of nitrogen oxides, regardless of whether the treatment is one designed to recover chemical values to to destroy or remove the pollutants.

The Nitrogen Oxides Recovery Process — FIG. 6

The nitrogen oxides recovery equipment and the process represented thereby is depicted in FIG. 6 by heavy lines and reference numerals. Only the second, nitrous material recovery step of my process need be used. The nitrous material generated and absorbed in the scrubbing solution in the previously described versions of my novel nitrogen oxides removal process is in this case generated and absorbed in the metal treating solution.

The process operates by removing solution from the bath, subjecting it to a partial vacuum to strip out the dissolved nitrous material (since this is done under vacuum, air is excluded, therefore, the nitrous materials, removed as gases, are not diluted with substantial amounts of air), and returning the stripped solution to the bath.

In FIG. 6:

Tank 3 is the desorption system. That shown is a short "tower" designed for operation under vacuum and packed with an acid resisting packing to provide additional surface area for the nitrous material to leave the liquid. Alternative systems such as splash plates, etc., can be employed.

Blower 4 compresses the mixture of nitrogen oxides and water vapor, removed from the desorption tank, from the partial vacuum in the tank to the pressure required for use or disposal of the gases.

Stream 10 is the nitrogen oxides gas stream removed from Tank 3 and suitable for use, as in a nitric acid recovery plant, or for disposal.

Stream 11 is a relatively small stream of liquid removed from the metal treating system for removal of nitrous material.

Stream 12 is the material removed from the metal treating system, treated for removal of nitrous material and now returned to the metal treating bath.

Pump 19 is used to circulate the stream to be treated through the nitrogen oxides desorption system.

In operation, solution laden with nitrous material is pumped by Pump 19 from Tank X to and sprayed into the upper end of Desorption Tank 3 where it is subjected to a vacuum. The nitrous material accordingly vaporizes and is compressed by Blower 4 for delivery to a user or for disposal. The solution which collects in the bottom of Desorption Tank 3, now free of nitrous materials, returns to the Acid bath, Tank X.

This desorption system is operated under a vacuum so that the temperature of the liquid returned to the bath will not be much lower than that in the bath itself. This temperature, the vapor pressure of the purged liquid at this temperature, and the specific gravity of the liquid will, in turn, determine the minimum vertical distance between the level of the liquid in the bath and the bottom of the desorption (flash) tank.

Depending upon individual conditions it may be necessary or advantageous to include a demisting pad (not shown) in the top of the flash tank.

Alternatives and Variants — FIG. 6

This system as shown is one in which several nitrogen oxides stripping systems could be hooked into one central vacuum system represented by Pump 4. In this case it would be necessary to provide a valve (not shown) between the top of the flash tank and the point at which the nitrogen oxides leaving the flash tank joins other similar streams so that each individual stripping system can be taken out of service without interrupting the operation of the remaining desorption units. An alternative would be to have a small blower for each flash tank.

No source of heat is shown to replace any heat removed from the liquid being purged of nitrogen oxides. This assumes that the amount of water, etc., evaporated in the desorption system, Flash Chamber 3, is small, and that the heater in the treating tank has enough capacity to replace the heat lost. If this is not so, if the amount of nitrogen oxides to be removed is large, or if the removal of nitrous materials must be very thorough, heat can be added to Stream 11. One way of doing this would be to provide an electric bayonet heater so connected that it cannot be turned on unless Pump 19 is operating and the necessary vacuum exists in Chamber 3.

The possibility of adding metals to the bath, in order to increase its capacity for nitrous materials, is limited in that nothing can be added which effects the main function of the bath. Some metals will be present, however, having been removed from the material treated. These can, if they are of proper character, function to increase the capacity of the bath for holding trivalent nitrogen compounds in stable solution.

The following examples demonstrate how nitrogen oxides can be removed from gas streams and from aqueous liquids in accord with the principles of the present invention:

EXAMPLE 1

Absorption of Nitric Oxide by 19.95% = 3.53 M Nitric Acid

An immersible thermometer and a teflon covered stirring bar were placed in a heavy walled flask of 1000 cc. nominal volume. The flask was then closed and connected, via heavy walled gum rubber tubing, to:
1. a vacuum pump;
2. a "lecture bottle" (small cylinder) of pure nitric oxide under high pressure;
3. a short piece of heavy walled gum rubber tubing (used as described later); and
4. one leg of a manometer filled with vacuum pump oil which had been "cleansed" of dissolved gases by subjecting it to a strong vacuum.

Each such connection was supplied with one or more heavy duty screw clamps which allowed the connection to be opened or closed at will. The flask and the reference leg of the manometer were then pumped to a vacuum (a residual pressure of less than 0.1 mm Hg absolute). The resulting manometer was capable of reading the absolute pressure in the flask in the range of 0 to 60 mm Hg absolute with an accuracy of ± 0.1 mm Hg.

The flask and the volume of the associated connections were pumped to a residual vacuum of 0.1 mm Hg and isolated from the vacuum pump. Pure nitric oxide was then admitted until the pressure was raised to 20.2 mm Hg absolute. The atmosphere in the flask was colorless which indicates no $NO_2$, $N_2O_3$, $N_2O_4$ (all of which are strong red in color) and no residual air which would, if present, react with the nitric oxide to produce $NO_2$, etc.

A gas tight syringe was then filled with 10 cc of 19.95 percent nitric acid. The heavy walled tube mentioned in 3 above was smeared with stop cock grease (to prevent in-leakage of air), and the acid was introduced to the flask by injecting it through the wall of the tube.

The pressure in the flask now stabilized at 29.9 mm Hg and the temperature at 62° F. Since the vapor pressure of 20 percent $HNO_3$ under these conditions is known to be 11.8 mm Hg, the partial pressure of the NO was 29.9 − 11.8 = 18.1 mm Hg. Additional amounts of nitric acid were then injected, producing the following results:

| Amount of Acid | Total Pressure | Vapor Pressure of $HNO_3$ | Partial Pressure NO |
|---|---|---|---|
| 0 | 20.3 mm Hg | 0 | 20.2 |
| 10 cc | 29.9 | 11.8 | 18.1 |
| 20 cc | 27.0 | 11.8 | 15.2 |
| 50 cc | 22.95 | 11.8 | 11.15 |

As shown by the tabulated data, an increase in the amount of nitric acid available produced a decrease in the pressure in the flask. Since the vapor pressure of the acid remained constant, this means that the added acid decreased the amount of the other gaseous materials in the flask, specifically nitric oxide.

The figures indicative of decreases in nitric oxide concentration are conservative because any failure in the system — e.g., failure to reach equilibrium or leakage of air into the system — would increase the pressure read in the later stages. This would reduce the pressure drop from stage to stage and therefore the amount of nitric oxide apparently absorbed.

Both the liquid and the gas in the flask remained apparently colorless indicating little or no formation of $NO_2$ (or $N_2O_3$ or $N_2O_4$ etc.) during the test.

EXAMPLE 2

Absorption of Nitric Oxide by 25% = 4.55 molar Nitric Acid

The procedure described in Example 1 was repeated using 25 percent nitric acid with the following results:

| Amount of Acid | Total Pressure | Vapor Pressure Of Nitric Acid | Partial Pressure of Nitrogen Oxides |
|---|---|---|---|
| 0 | 19.75 mm Hg | 0 | 19.75 |
| 5 cc | 31.1 | 12.2 | 18.9 |
| 15 cc | 26.95 | 12.2 | 14.75 |
| 35 cc | 23.0 | 12.2 | 10.8 |

Again, the procedure was effective in decreasing the nitric oxide present in the flask. Several differences were noted:

The acid was slightly warmer giving a higher vapor pressure.

The drop in gas partial pressure produced by 35 cc of this acid equalled that produced by 50 cc of the weaker acid.

The liquid remained colorless.

The gas in the flask showed a slight but definite, yellowish tinge indicating formation of a minor amount of $NO_2$ (or $N_2O_3$, etc.).

In spite of the formation of minor amounts of $NO_2$, etc. (which would be expected in equilibrium with this stronger acid), the acid was still effective in producing a major net absorption of the nitrogen oxides as indicated by the decrease in pressure upon the introduction of additional amounts of acid.

EXAMPLE 3

Absorption of Mixed Nitrogen Oxides (and the effect of Nitric Acid and Copper Nitrate)

The procedure and apparatus outlined in Example 1 were used as follows: Step 1. 20 cc of distilled water injected into flask. Step 2. Pure NO introduced into flask. Gas remained colorless. Step 3. 7 cc of the 70 percent (15.7 M) nitric acid injected into the flask (equivalent to an average liquid concentration of 23.2 percent or 4.17 M $HNO_3$).

The 70 percent $HNO_3$ was injected so that it did not mix with the water immediately but rained down through the gas and splattered onto and stuck on the wall of the flask. The liquids, acid and water, were later mixed.

The gas in the flask immediately turned a strong red and then faded over about 5 minutes to a light but definite yellow. This indicates the formation and subsequent absorption of substantial amounts of $NO_2$ (produced by oxidation of NO by the 70 percent $HNO_3$).

Step 4. 3 cc of 70 percent (15.7 M) nitric acid injected as above. The average liquid composition was now 29.05 percent or 5.4 N $HNO_3$. The atmosphere turned pale to medium red and then faded, over 10–15 minutes, to a very pale red.

Step 5. 10 cc (14.6 gr.) of 40.5 percent Cu $(NO_3)_2$ solution injected.

The average liquid composition was now:
20.3 percent $HNO_3$
12.1 percent $Cu(NO_3)_2$ The atmosphere in the flask was now almost clear.

The pressure data are as follows:

| | Total Pressure | Liquid Vapor Pressure | $NO_x$ Pressure | Color |
|---|---|---|---|---|
| Step 1 | 19.85 | 19.85 | 0.0 | clear |
| Step 2 | 35.6 | 19.85 | 15.75 | clear |
| Step 3 | 28.35 | 16.7 | 11.65 | Strong red fading to pale yellow |
| | 23.2% $HNO_3$ | | | |
| Step 4 | 25.4 | 15.8 | 9.7 | Medium red fading to pale red |
| | 29.05% $HNO_3$ | | | |
| Step 5 | 23.8 | Unknown | | Atmosphere faded to very pale yellow |
| | 20.3% $HNO_3$, 12.1% $Cu(NO_3)_2$ | | | |

The data shows that a definite decrease in the amount of nitrogen oxides present in the flask was obtained.

EXAMPLE 4

Absorption of Nitric Oxide in and Desorption of Mixed Nitrogen Oxides from a Nitric Acid - Cupric Nitrate Solution A solution consisting of:
Nitric Acid ($NHO_3$); 20.3 wt%
Cupric Nitrate [$Cu(NO_3)_2$]; 12.1 wt%
Water; 67.6 wt%
was made and divided into two parts. Part 1. Evacuated the flask described in Working Example 1, isolated it as described, and injected 10 ml of above solution. This produced a pressure (corresponding to the vapor pressure of the solution) of 10.9 mm Hg. The atmosphere in the flask remained clear and colorless. Part 2. Bubbled NO through this sample for 3 minutes and injected 10 ml of solution as above. This produced a pressure of 14.9 mm Hg, and the atmosphere in the flask was a very definite medium red.

The added pressure from Part 2 indicates desorption of absorbed gases from Part 2 which were not present in Part 1.

The red color produced by Part 2 indicates:
(1) that some of the gases desorbed were $NO_2$ (or $N_2O_3$ or $N_2O_4$); and
(2) that, therefore, the solution oxidized some of the nitric oxide fed to it.

EXAMPLE 5

Absorption of Nitric Oxide by 29.9%–5.60 Molar Nitric Acid

The procedure described in Example 1 was repeated using 29.9 percent nitric acid with the following results:

| Amount of Acid | Total Pressure | Vapor Pressure of Nitric Acid | Partial Pressure of Nitrogen Oxides |
|---|---|---|---|
| 0 | Not taken | | |
| 5 cc | 29.5 mm Hg | 10.7 mm Hg | 18.8 mm Hg |
| 15 cc | 24.8 mm Hg | 10.7 mm Hg | 14.1 mm Hg |
| 35 cc | 20.1 mm Hg | 10.7 mm Hg | 9.4 mm Hg |
| 45 cc | 18.7 | 10.7 mm Hg | 8.0 mm Hg |

Observations and Comparisons:

The yellow color of the gas in this experiment seemed stronger than that in Example 2, but (also) seemed to become lighter as the experiment proceeded (i.e., as more liquid was added).

The reaction was faster than in Example 2.

The liquid appeared to absorb more nitrogen oxides although at least part of this is probably caused by a better approach to equilibria (via faster reaction).

EXAMPLE 6

Absorption of Nitric Oxide by 40.1% = 7.93 Molar Nitric Acid

The procedure described in Example 1 was repeated using 40.1 percent nitric acid with the following results:

| Amount of Acid | Total Pressure | Vapor Pressure of Nitric Acid | Partial Pressure of Nitrogen Oxides |
|---|---|---|---|
| 0 | 20.05 mm Hg | 0 | 20.05 mm Hg |
| 5 cc | 29.75 mm Hg | 8.9 mm Hg | 20.85 mm Hg |
| 15 cc | 26.15 mm Hg | 9.0 mm Hg | 17.15 mm Hg |
| 35 cc | 21.25 mm Hg | 9.0 mm Hg | 12.15 mm Hg |
| 45 cc | 20.05 mm Hg | 9.0 mm Hg | 11.05 mm Hg |

Observations and Comparisons:

The gas in this experiment was initially clear and colorless, indicating no $NO_2$, $N_2O_3$ or $N_2O_4$, but changed, over several minutes, to a yellowish red when the acid was added.

The reaction was prompt and the approach to equilibrium definite, much more so than in Example 5.

The liquid absorbed less nitrogen oxides than did the gas in Example 5 in spite of the fact that this experiment certainly approached equilibrium more rapidly.

EXAMPLE 7

Absorption of Nitric Oxide by Acid Solutions of Nitrate Salts

The procedure described in Example 1 was repeated using a solution containing:
Nitric Acid ($HNO_3$); 4.39%
Cupric Nitrate ($Cu(NO_3)_2$); 50.0%
Water; 45.6%
which had a density of 1.69 gr./cc. The corresponding (initial) concentrations were:
($H^+$) = 1.177 M (= 1.177 N)
($Cu^{++}$) = 9.02 M (= 18.04 N)
($NO_3^-$) = 19.22 M (= 19.22 N)
The results were as follows:

| Amount of Solution | Total Pressure | Vapor Pressure of Solution | Partial Pressure of Nitric Oxides |
|---|---|---|---|
| 0 cc | 18.97 mm Hg | 0 | 18.97 mm Hg |
| 5 cc | 26.9 mm Hg | 6.15 mm Hg | 20.75 mm Hg |
| 15 cc | 29.0 mm Hg | 6.65 mm Hg[(1)] | 22.5 mm Hg |
| (Added 10 cc of Water) | | | |
| 25 cc | 28.0 mm Hg | 12.5 mm Hg | 15.5 mm Hg |

[(1)]This slight increase was caused by an increase in solution temperature.

The final ionic concentrations (upon adding 10 cc of pure water to 15 cc of solution) were:
($H^+$) = 0.706 M (0.706 N)
($Cu^{++}$) = 5.41 M (= 10.82 N)
($NO_3-$) = 11.53 M (= 11.53 N)

The vapor pressures of the solutions were, in all cases, determined in an identical sequence except no nitric oxide was introduced.

The gas was colorless at the start, indicating pure NO, no $NO_2$, $N_2O_3$ or $N_2O_4$. The initial addition of the solution (5 cc) turned the gas yellow which deepened with time; and addition of the further 10 cc turned the gas a strong red, indicating a substantial conversion of NO (to $NO_2$ etc.). In other words, this solution, only 1.177 M in nitric acid, but 9 M in $Cu(NO_3)_2$, was more powerful, in oxidizing nitric oxide, than was the 7.93 M nitric acid used in Example 6.

An injection of 10 cc of pure water caused the prompt disappearance of almost all the red color of the gas indicating near complete removal of the $NO_2$ (and $N_2O_3$, $N_2O_4$). In spite of this removal, the pressure in the flask initially rose, by about 1.3 mm Hg, because of the increased vapor pressure of the solution, and then dropped quite rapidly to its new value.

EXAMPLE 8

Absorption of Nitric Oxide by Acidic Cupric Nitrate Solutions

The equipment and basic procedure outlined in Example 1 (introduction of nitric oxide gas followed by injection of liquid) was used with:

Solution No. 1 38.8 percent Cupric Nitrate Solution (density = 1.46 gr./cc.; cencentration = 3.02 M or 6.04 N).
Solution No. 2 18.05 percent $HNO_3$ (= 3.16 M)
Solution No. 3 70 percent $HNO_3$ (= 15.7 M)

with the following results:

| Amount of Solution | Solution Concentration | | Total Pressure | Gas Color |
|---|---|---|---|---|
| | $Cu(NO_3)_2$ | $HNO_3$ | | |
| 0 cc | | | 19.35 mm Hg | Colorless |
| 5 cc | 3.02M (=6N) | 0.0 M | 30.6 mm Hg | Colorless |
| 15 cc | 3.02M (=6N) | 0.0 M | 30.8 mm Hg | Colorless |
| 35 cc | 3.02M (=6N) | 0.0 M | 31.6 mm Hg | Colorless |
| 36 cc | 2.94M (=5.9N) | 0.088 M | 31.9 mm Hg | Colorless |
| 37 cc | 2.86M (=5.7N) | 0.57 M | | |
| | | | Initial 34.45 mm Hg | Strong red |
| | | | Intermediate 29.6 mm Hg | Weak red |
| | | | Final 27.0 mm Hg | Yellow |

The pure cupric nitrate solution has little or no apparent effect (the slow rise in pressure between 5 and 35 cc is caused by a slow rise in the temperature of the liquid).

The addition of weak nitric acid to produce 0.09 M $HNO_3$ in the solution had no apparent effect. This may have been (only) because the rate of reaction was too slow to be observed in the time available.

The addition of strong acid to produce 0.57N $HNO_3$ solution produced the following prompt results:
An initial, prompt deep red and sharp pressure rise;
A prompt fading accompanied by a pressure drop;
Further fading to faint yellow with continuing pressure drop; and
Continued pressure drop without further color change.

This proves that some amount of acid is necessary (because [$H^+$] is the only new species provided by the addition of nitric acid). Any acid should be suitable provided, of course, that the anion does not "poison" the reaction for some reason. No such poison, active in this system, is known.

To summarize the examples
1 19.95% = 3.53 M Nitric Acid
2 25.0% = 4.55 M Nitric Acid
5 29.9% = 5.60 M Nitric Acid
6 40.1% = 7.93 M Nitric Acid
were run under essentially identical conditions. The data from these runs, Partial Pressure of Nitrogen Oxides vs. Volume of Solutions Added, is presented in the following table:

| Volume of Solution Added (cubic cm) | Partial Pressure of Nitrogen Oxides | | | |
|---|---|---|---|---|
| | Run No. 1 | Run No. 2 | Run No. 5 | Run No. 6 |
| 0 | 20.2 mm Hg | 19.75 mm Hg | | 20.05 mm Hg |
| 5 | | 18.9 mm Hg | 18.8 mm Hg | 20.85 mm Hg |
| 10 | 18.1 mm Hg | | | |
| 15 | | 14.75 mm Hg | 14.1 mm Hg | 17.15 mm Hg |
| 20 | 15.2 mm Hg | | | |
| 35 | | 10.8 mm Hg | 9.4 mm Hg | 12.15 mm Hg |
| 45 | | | 8.0 mm Hg | 11.05 mm Hg |
| 50 | 11.15 mm Hg | | | |

A comparison of these data, directly or in a plot, indicates that the effectiveness of nitric acid solutions, under these NO pressures and operating temperatures increases as concentration rises from 20 percent to 30 percent and decreases when concentration rises from 30 percent to 40 percent.

This is an accordance with the information disclosed; i.e., at low nitric acid concentration the allowable nitrous acid concentration varies with nitric acid concentration;

$$(HNO_2) = K[(H^+)(NO_3^-)(P_{NO})^2]^{1/3}$$

at higher nitric acid concentrations this trend is overshadowed by the loss of nitrous acid from solution caused by oxidation of a greater fraction of the nitrous materials to the tetravalent ($NO_2$ etc.) state.

Example 3 shows the same situation. The amount of nitrogen oxides removed from the gas increases as the nitric acid concentration increases from 0 percent to 23.2 percent to 29.05 percent.

The effectiveness of a soluble nitrate in replacing a substantial fraction of the nitric acid as an oxidant for nitrous acid and other nitrous materials is shown in Example 7 in which a strong solution of cupric nitrate, 1.177 M in acid, acted as a powerful oxidant but was ineffective as an absorbant. This is what would normally be expected by an acid in the 55 percent to 70 percent (11.7 to 15.7 M) concentration range. Dilution of this salt solution with pure water rendered it effective as an absorbent of nitrous gases.

The same is shown in Example 8 in which acidification of a less concentrated cupric nitrate solution to a level of acid (0.57 M) substantially less than that necessary for the acid itself to be an effective absorbant, converted the salt solution to an effective absorbant for nitrogen oxides.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A method of removing the sparingly soluble compound nitric oxide from industrial gases comprising an admixture of said nitric oxide and at least one other gas and recovering said nitric oxide in concentrated form, said process including the steps of: oxidizing the nitric oxide to the soluble trivalent state by so contacting it with an aqueous, nitrate ion containing solution as to effect the reaction $$2NO + NO_3^- + H_2O \rightarrow 3NO_2^- + 2H^+;$$

dissolving the trivalent material in the water present in said solution to thereby separate the trivalent material from said gases; and stripping the dissolved trivalent nitrogen material from the aqueous solution, the concentration of nitrate ion in said solution being maintained in the range of 1–11.5 normal during the aforesaid steps to inhibit the decomposition of the dissolved trivalent material and the oxidation of the nitric oxide past the trivalent state, thereby maximizing the separation of the nitric oxide from the admixture.

2. A method as defined in claim 1 in which a part of the nitric oxide is converted to nitrogen dioxide before said nitric oxide is contacted with said aqueous, nitrate ion containing solution and in which said nitrogen dioxide is dissolved in the aqueous solution along with the trivalent material resulting from the oxidation of the remaining nitric oxide, thereby increasing the capacity of the solution for absorbing nitrogen oxides.

3. A method as defined in claim 2 in which the conversion of nitric oxide to nitrogen dioxide is effected by cooling the admixture of gases.

4. A process as defined in claim 2 in which the oxidation of the nitric oxide is carried out at approximately room temperature in an aqueous solution having a nitrate ion concentration in the range of 4 to 6 normal.

5. A method as defined in claim 2 in which the nitric oxide is catalytically converted to nitrogen dioxide.

6. A method as defined in claim 2 in which air is added to the gases in the course of converting the nitric oxide to nitrogen dioxide.

7. A method as defined in claim 2 in which the nitric oxide is converted to nitrogen dioxide by reacting said nitrogen oxide with nitric acid.

8. A method as defined in claim 2 in which essentially all of the nitrate ion is supplied by nitric acid incorporated in the aqueous solution.

9. A method as defined in claim 2 in which, after the trivalent material is removed from the aqueous solution, at least one ionizable, nitrate ion supplying material selected from the group consisting of nitric acid, alkali metal nitrates, alkaline earth nitrates, nitrates of amphoteric materials, nitrates of materials which exhibit more than one valence, nitrates of the lanthanides, nitrates of the acitinides, and materials capable of reacting with nitric acid to produce one or more nitrates as aforesaid is added to the aqueous solution to restore the nitrate ion concentration to the selected level.

10. A method as defined in claim 2 in which said industrial gases also include at least one nitrogen oxide other than nitric oxide which is trivalent or reactible with water to form a trivalent compound.

11. A process as defined in claim 2 in which the oxidation of the nitric oxide is carried out at ambient temperature in an aqueous solution having a nitrate ion concentration in the range of 2 to 8 normal.

12. A method as defined in claim 2 in which oxygen is added to the gases in the course of converting the nitric oxide to nitrogen dioxide.

13. A method as defined in claim 2 in which said solution contains nitrate compounds which are capable of reacting with trivalent nitrogen compounds present in the solution to form unionized nitrite complexes and thereby prevent the escape of said trivalent nitrogen compounds from the solution.

14. A method as defined in claim 13 in which the solution contains copper nitrate.

15. A method of removing nitric oxide from industrial gases comprising an admixture of said oxide and at least one other gas and recovering said nitric oxide in a concentrated form, said method including steps of: so contacting the gases in said admixture with an aqueous, nitrate ion containing solution having a nitrate ion concentration in the range of 1–11.5 normal as to effect the reaction $$2NO + NO_3^- + H_2O \rightarrow 3NO_2^- + 2H^+$$

at a rate $$k'[HNO_2][H^+][NO_3^-] - \frac{k[HNO_2]^4}{(P_{NO})^2} > 0,$$

thereby oxidizing said nitric oxide to the soluble trivalent state; dissolving the oxidized nitric oxide in said solution to thereby separate said oxide from the admixture; and, then, stripping the dissolved trivalent nitrogen material from the aqueous solution by reversal of the above reaction at a rate $$\frac{k[HNO_2]^4}{(P_{NO})^2} - k'[HNO_2][H^+][NO_3^-] > 0,$$

where
- [$HNO_2$] is the trivalent nitrogen acid concentration in gram moles per liter,
- [$H^+$] is the hydrogen ion activity in gram moles per liter,
- [$NO_3^-$] is the nitrate ion activity in gram moles per liter,
- ($P_{NO}$) is the partial pressure of nitric oxide gas in atmospheres,
- $k'$ is a temperature-correlated constant equal to about 1.6 at 25° C., and
- $k$ is a temperature-correlated constant equal to about 46° at 25° C.

16. A method as defined in claim 15 in which a part of the nitric oxide is converted to nitrogen dioxide before said nitric oxide is contacted with said aqueous, nitrate ion containing solution and in which said nitrogen dioxide is dissolved in the aqueous solution along with the trivalent material resulting from the oxidation of the remaining nitric oxide, thereby increasing the capacity of the solution for absorbing nitrogen oxides.

17. A method as defined in claim 15 in which, after the trivalent material is removed from the aqueous solution, at least one ionizable, nitrate ion supplying material selected from the group consisting of nitric acid, alkali metal nitrates, alkaline earth nitrates, nitrates of amphoteric materials, nitrates of material which exhibit more than one valence, nitrates of the lanthanides, nitrates of the actinides, and materials capable of reacting with nitric acid to produce one or more nitrates as aforesaid is added to said solution to restore the nitrate ion concentration to the selected level.

18. A method as defined in claim 15 in which said industrial gases also include at least one nitrogen oxide other than nitric oxide which is trivalent or reactible with water to form a trivalent compound.

19. A process as defined in claim 15 in which the oxidation of the nitric oxide is carried out at ambient temperature in an aqueous solution having a nitrate ion concentration in the range of 2 to 8 normal.

20. A method as defined in claim 15 in which said solution contains nitrate compounds which are capable of reacting with trivalent nitrogen compounds present in the solution to form unionized nitrate complexes and thereby prevent the escape of said trivalent nitrogen compounds from the solution.

21. A method as defined in claim 20 in which the solution contains copper nitrate.

* * * * *

UNITED STATES PATENT OFFICE
CERTIFICATE OF CORRECTION

Patent No. 4,118,460            Dated  Oct. 3, 1978

Inventor(s)    Donald W. Bolme

It is certified that error appears in the above-identified patent and that said Letters Patent are hereby corrected as shown below:

Amend lines 25 and 26 of column 10 to read as follows:

--2 $(HNO_2) \longrightarrow H_2O + NO + NO_2$                    (8)

or by evaporation of the nitrous acid itself.--.

Column 28, line 41, change "$H_2O_3$" to --$N_2O_3$--.

Column 29, line 68, change "Acid" to --said--.

Column 32, line 24, delete "the".

Column 33, line 8, change "$(NHO_3)$" to --$(HNO_3)$--.

Column 35, line 9, change "cencentration" to --concentration--.

Column 36, line 7, change "an" to --in--.

Column 37, claim 9, line 43, change "acitinides" to --actinides--.

Signed and Sealed this

Sixth Day of March 1979

[SEAL]

Attest:

RUTH C. MASON
Attesting Officer

DONALD W. BANNER
Commissioner of Patents and Trademarks